United States Patent
Otsuka et al.

(10) Patent No.: US 6,668,057 B1
(45) Date of Patent: Dec. 23, 2003

(54) APPARATUS FOR RECEIVING TONE SIGNAL, APPARATUS FOR TRANSMITTING TONE SIGNAL, AND APPARATUS FOR TRANSMITTING OR RECEIVING TONE SIGNAL

(75) Inventors: Eiji Otsuka, Hino (JP); Takeshi Yamashita, Hino (JP); Yoshiko Hase, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 556 days.

(21) Appl. No.: 09/717,229

(22) Filed: Nov. 22, 2000

(30) Foreign Application Priority Data

Nov. 24, 1999 (JP) .............................. 11-333371
Nov. 21, 2000 (JP) ........................ 2000-354330

(51) Int. Cl.$^7$ ........................ H04M 3/00; H04M 1/00; G06F 17/10
(52) U.S. Cl. .................. 379/283; 379/361; 379/386; 708/311
(58) Field of Search ................. 379/282, 283, 379/338, 360, 361, 386; 708/311, 109, 312, 317; 704/201, 225, 268; 341/147; 327/106; 375/375

(56) References Cited

U.S. PATENT DOCUMENTS

| | | | | |
|---|---|---|---|---|
| 4,058,805 A | 11/1977 | Lake | ........................ | 341/147 |
| 5,321,745 A | * 6/1994 | Drory et al. | ................. | 379/351 |
| 6,370,555 B1 | * 4/2002 | Bartkowiak | ................. | 708/311 |
| 6,591,234 B1 | * 7/2003 | Chandran et al. | ........... | 704/225 |

FOREIGN PATENT DOCUMENTS

| | | |
|---|---|---|
| EP | 0 349 162 | 1/1990 |
| JP | 54-120511 | 9/1979 |
| JP | 6-98356 | 4/1994 |
| JP | 9-54124 | 2/1997 |
| JP | 9-327047 | 12/1997 |

* cited by examiner

Primary Examiner—Benny Tieu
(74) Attorney, Agent, or Firm—Finnegan, Henderson, Farabow, Garrett & Dunner, L.L.P.

(57) ABSTRACT

An arithmetic processing section is designed to repeatedly execute product-sum arithmetic processing a number of times equal to the number of samples corresponding to each of the frequencies, in which a value obtained by subtracting a product-sum arithmetic value two sampling periods before from an input signal and a value obtained by multiplying a product-sum arithmetic value one sampling period before by a coefficient corresponding to a reference frequency contained in a DTMF signal are added. A comparator extracts an output value equal to or larger than a predetermined threshold value from the product-sum arithmetic values obtained by the arithmetic processing section. A matrix section determines the type of DTMF signal on the basis of at least two output values extracted by the comparator.

16 Claims, 20 Drawing Sheets

LINE CODE CONVERSION (μ-255 RULE)
POLARITY IS REMOVED, AND LINEAR VALUE AFTER
SHIFTING HAS 13 BITS

| COMPRESSION CODE | LINEAR DATA |
|---|---|
| 000wxyz | 00000001wxyz1 |
| 001wxyz | 0000001wxyz10 |
| 010wxyz | 000001wxyz100 |
| 011wxyz | 00001wxyz1000 |
| 100wxyz | 0001wxyz10000 |
| 101wxyz | 001wxyz100000 |
| 110wxyz | 01wxyz1000000 |
| 111wxyz | 1wxyz10000000 |

FIG. 7A

LINE CODE CONVERSION (A RULE)
POLARITY IS REMOVED, AND LINEAR VALUE AFTER
SHIFTING HAS 12 BITS

| COMPRESSION CODE | LINEAR DATA |
|---|---|
| 000wxyz | 0000000wxyz1 |
| 001wxyz | 0000001wxyz1 |
| 010wxyz | 000001wxyz10 |
| 011wxyz | 00001wxyz100 |
| 100wxyz | 0001wxyz1000 |
| 101wxyz | 001wxyz10000 |
| 110wxyz | 01wxyz100000 |
| 111wxyz | 1wxyz1000000 |

FIG. 7B

| DETECTION FREQUENCY [Hz] | NUMBER OF SAMPLES N | K | ACTUAL DETECTION FREQUENCY [Hz] |
|---|---|---|---|
| 697 | 195 | 17 | 697.4 |
| 770 | 197 | 19 | 771.5 |
| 852 | 197 | 21 | 852.8 |
| 941 | 196 | 23 | 938.8 |
| 1209 | 106 | 16 | 1207 |
| 1336 | 102 | 17 | 1333 |
| 1477 | 103 | 19 | 1476 |
| 1633 | 103 | 21 | 1631 |

$$\frac{f_{tone}}{f_s} = \frac{k}{N}$$

$f_{tone}$ : DETECTION FREQUENCY
$f_s$ : SAMPLING FREQUENCY
N : NUMBER OF SAMPLES

| LOW-FREQUENCY COMPONENT | HIGH-FREQUENCY COMPONENT | DIGIT | LOW LED | HIGH LED |
|---|---|---|---|---|
| 697 | 1209 | 1 | 1 | 1 |
| 697 | 1336 | 2 | 1 | 2 |
| 697 | 1477 | 3 | 1 | 3 |
| 770 | 1209 | 4 | 2 | 1 |
| 770 | 1336 | 5 | 2 | 2 |
| 770 | 1477 | 6 | 2 | 3 |
| 852 | 1209 | 7 | 3 | 1 |
| 852 | 1336 | 8 | 3 | 2 |
| 852 | 1477 | 9 | 3 | 3 |
| 941 | 1209 | 0 | 4 | 1 |
| 941 | 1336 | * | 4 | 2 |
| 941 | 1477 | # | 4 | 3 |
| 697 | 1633 | A | 1 | 4 |
| 770 | 1633 | B | 2 | 4 |
| 852 | 1633 | C | 3 | 4 |
| 941 | 1633 | D | 4 | 4 |

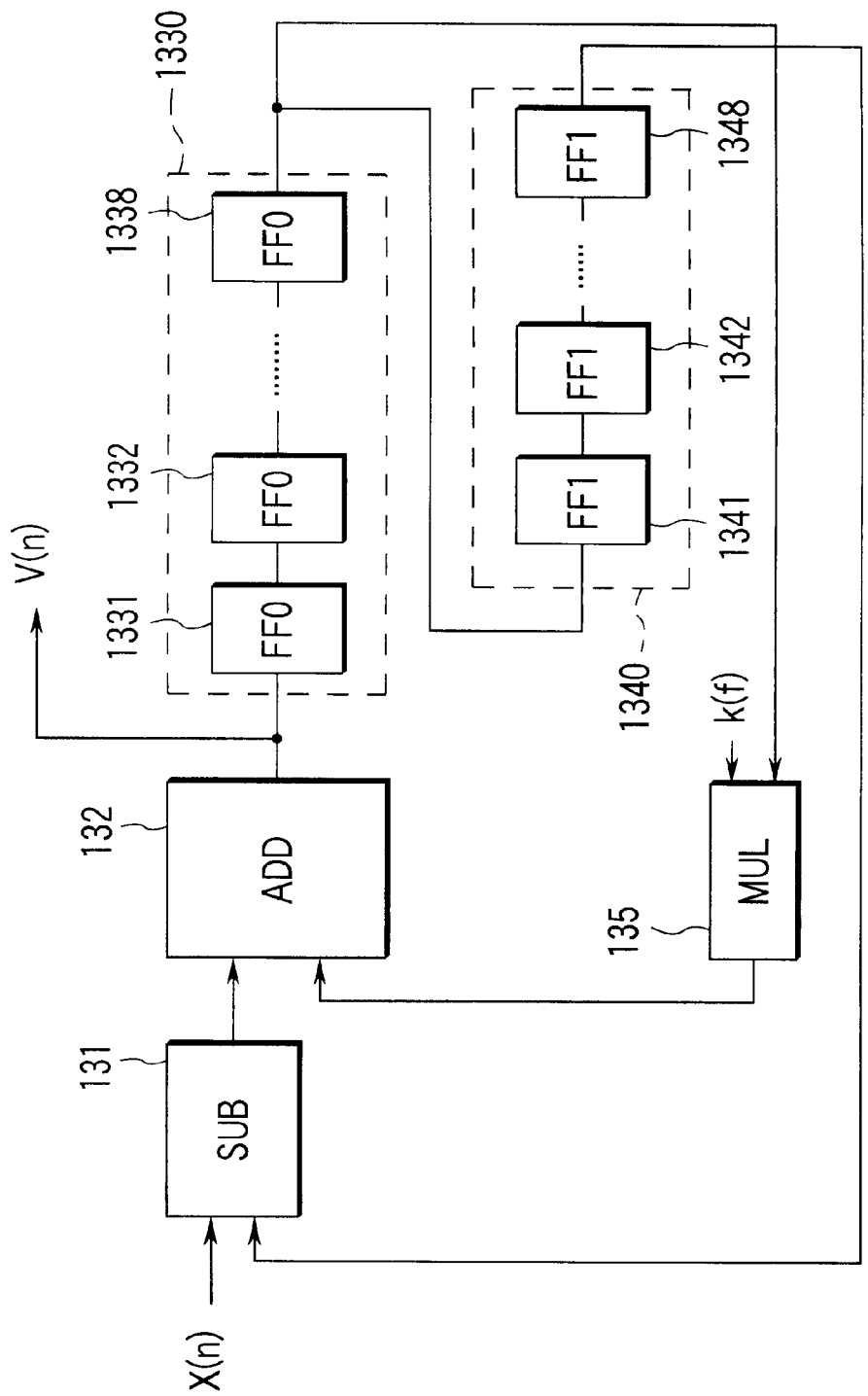
F I G. 18

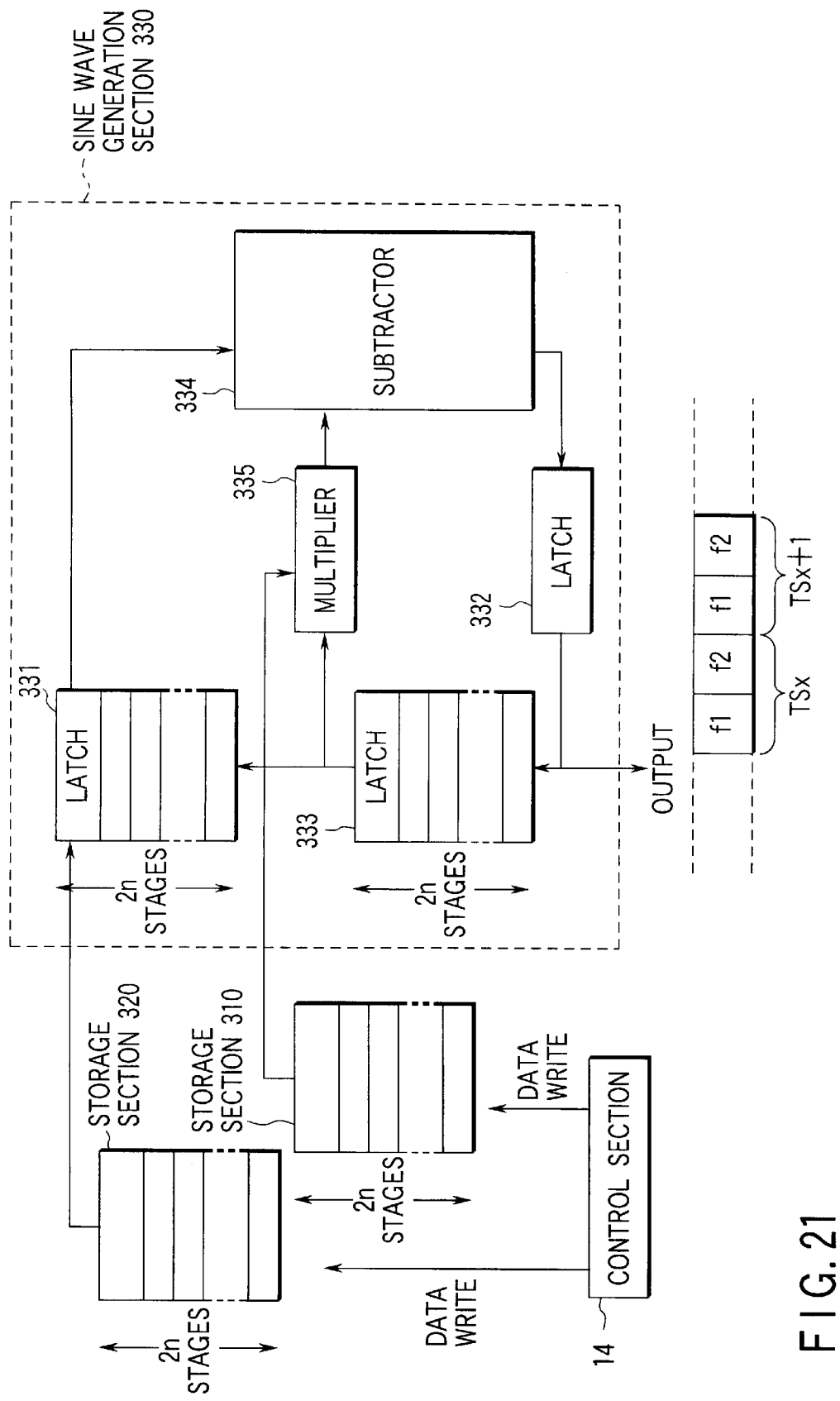
F I G. 21

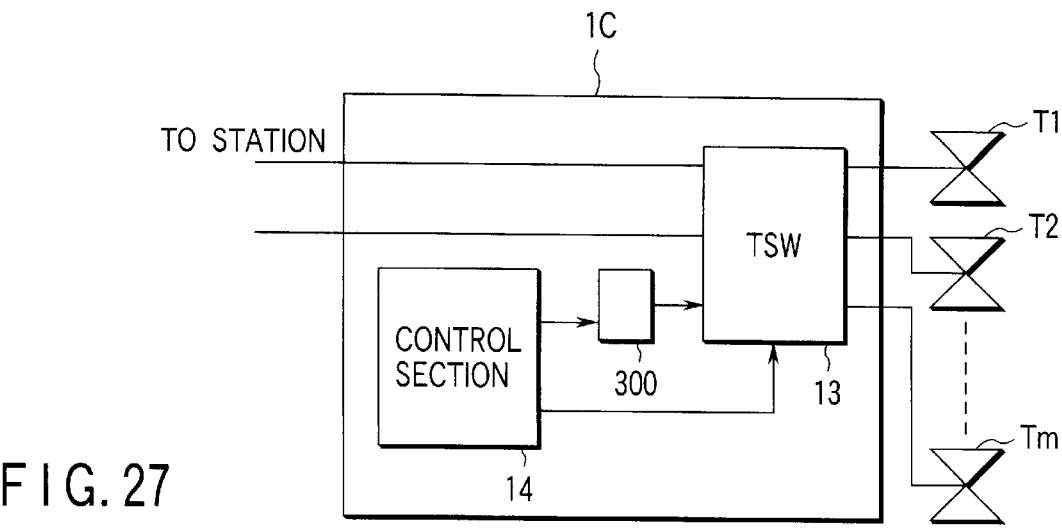
F I G. 27
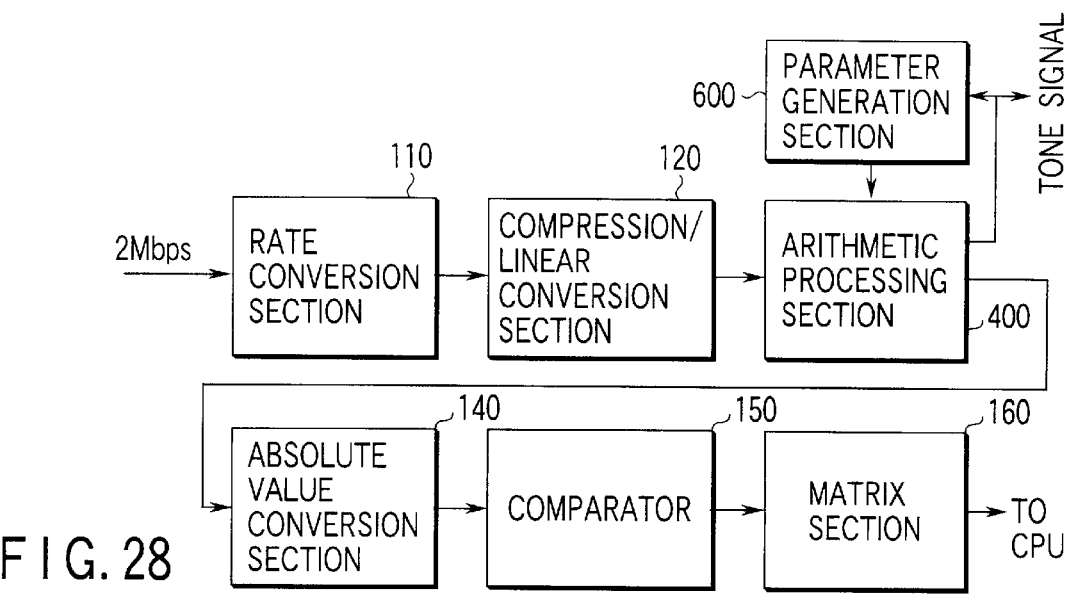
F I G. 28
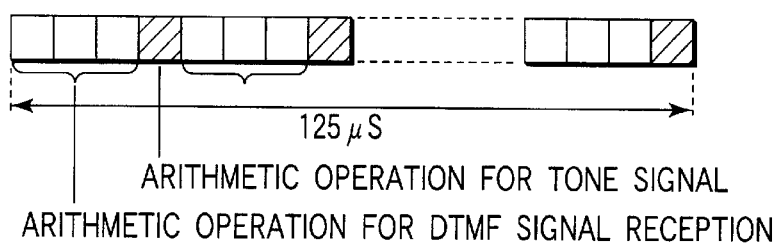
F I G. 30

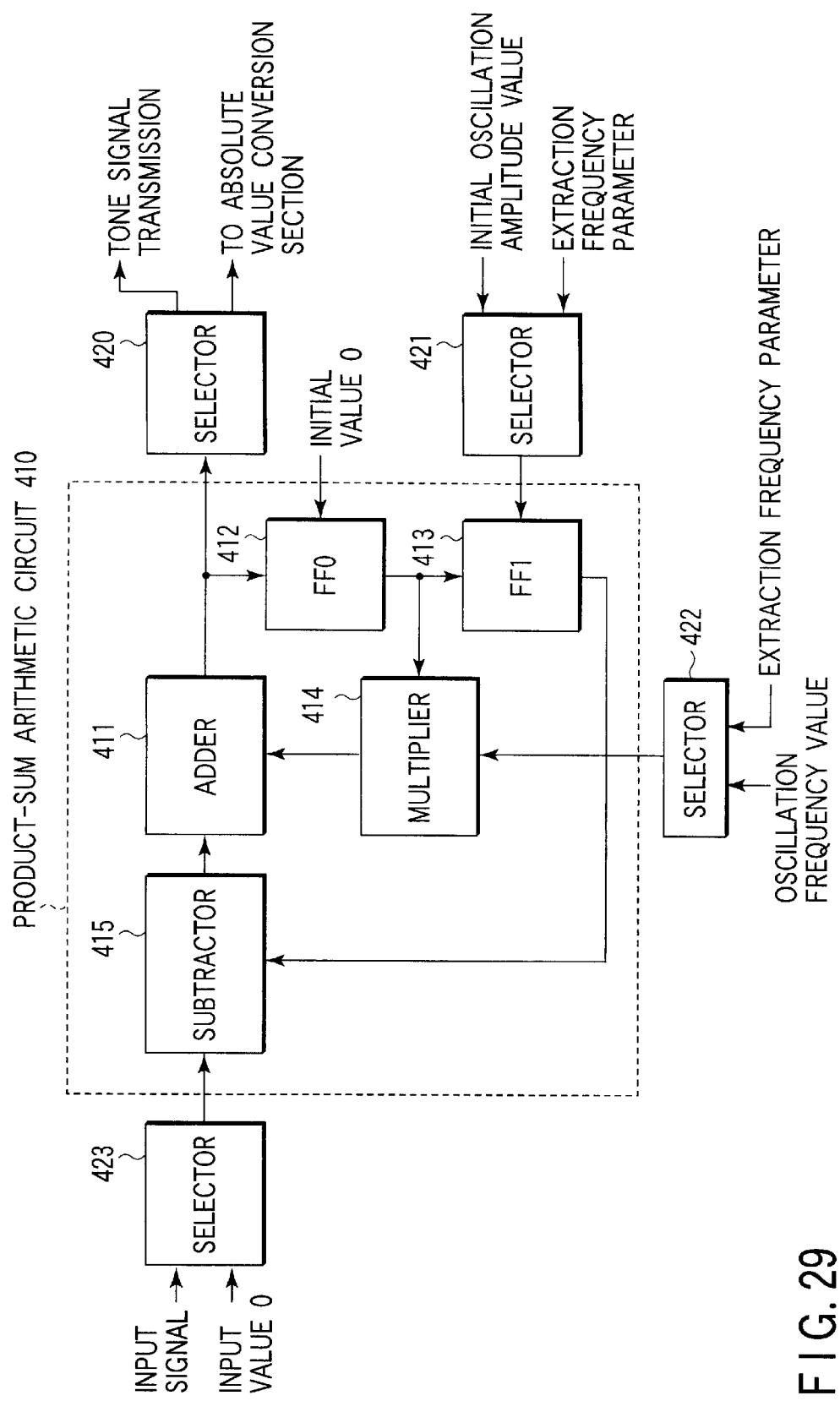
F I G. 29

APPARATUS FOR RECEIVING TONE SIGNAL, APPARATUS FOR TRANSMITTING TONE SIGNAL, AND APPARATUS FOR TRANSMITTING OR RECEIVING TONE SIGNAL

CROSS-REFERENCE TO RELATED APPLICATIONS

This application is based upon and claims the benefit of priority from the prior Japanese Patent Application No. 11-333371, filed Nov. 24, 1999, the entire contents of which are incorporated herein by reference.

BACKGROUND OF THE INVENTION

The present invention relates to a tone signal receiving apparatus for detecting a tone signal, a tone signal transmitting apparatus for generating a tone signal, and a tone signal transmitting/receiving apparatus having a function of receiving a tone signal and transmitting a tone signal, which are used in the field of communications and, more particularly, to a tone signal receiving apparatus, tone signal transmitting apparatus, and tone signal transmitting/receiving apparatus, which implement the above tone signal receiving apparatus, tone signal transmitting apparatus, and tone signal transmitting/receiving apparatus by digital circuits, respectively.

Conventionally, in a key telephone system used in an office building or business office, a key telephone main apparatus (to be referred to as a main apparatus hereinafter) having a switching function has the arrangement shown in FIG. 1. Reference numeral 1A denotes a main apparatus.

Referring to FIG. 1, the main apparatus 1A comprises a trunk unit 11, line card 12, time switch section (to be referred to as a TSW hereinafter) 13, control section 14, and DTMF (Dual Tone Multi Frequency) signal receiving section 15. These components are connected to each other through a voice bus (to be referred to as a PCMHW hereinafter) 16 and control bus (to be referred to as a DHW hereinafter) 17.

The trunk unit 11 is connected to an external communication network NW through a subscriber's line ISL and has an interface function to the external communication network NW. The line card 12 is connected to extension terminals T1 to Tm through a plurality of extension lines EL1 to ELm and has an interface function to these extension terminals T1 to Tm. Examples of the extension terminals T1 to Tm are standard telephone sets and key telephone sets.

The TSW 13 selectively connects the trunk unit 11 to the line card 12 in accordance with an instruction from the control section 14. The TSW 13 also selectively connects one of the trunk unit 11 and line card 12 to the DTMF signal receiving section 15.

The DTMF signal receiving section 15 has a codec 15a and PB receiver 15b. The codec 15a converts an input digital signal into an analog signal and outputs the analog signal to the PB receiver 15b. The PB receiver 15b detects and identifies a DTMF signal from the input analog signal.

The operation of detecting a DTMF signal in the main apparatus 1A will be described below.

When the user presses a dial key on the extension terminal T1, a DTMF signal according to the dial key is generated from the extension terminal T1 This DTMF signal contains high- and low-frequency orthogonal components, as shown in FIG. 2. The DTMF signal is transferred to the TSW 13 through the line card 12 and PCMHW 16 and then transferred to the DTMF signal receiving section 15 through the TSW 13 and PCMHW 16.

In the DTMF signal receiving section 15, a number of codecs 15a must be prepared in units of channels because each codec 15a extracts a signal on a predetermined channel of a number of channels multiplexed on the PCMHW 16. The necessary number of codecs 15a is eight for 100 accommodated lines. Hence, the DTMF signal receiving section 15 has a large circuit scale, and integration for cost reduction is difficult.

In recent years, processing by the DTMF signal receiving section 15 may be implemented using a DSP (Digital Signal Processor).

FIG. 3 shows the internal block of a DTMF signal receiving section using a DSP.

This DTMF signal receiving section comprises a control bus interface section (to be referred to as a DHW I/F hereinafter) 21, CPU 22, and DSP 23. The DHW I/F 21 has an interface function to the DHW 17. The CPU 22 controls processing of the DSP 23 on the basis of a control signal supplied from the DHW 17 through the DHW I/F 21. The DSP 23 has a storage section 231 which stores a Goertzel algorithm to be described below. More specifically, the DSP 23 detects and identifies a DTMF signal from a PCM signal supplied from the PCMHW 16 in accordance with the program stored in the storage section 231 upon receiving an instruction from the CPU 22.

The Goertzel algorithm will be described below.

This Goertzel algorithm is optimum to DTMF signal detection by the discrete Fourier transform, in which a signal on the time axis is converted into a signal on the frequency axis and output, as in the Fourier transform. Generally, in the Fourier transform, when input signals at N sampling points on the time axis are calculated, output signals at N points are obtained on the frequency axis. In the Fourier transform, however, when only eight frequencies suffice as output points for such DTMF signal detection, the arithmetic operation is wasteful.

To prevent this, in the Goertzel algorithm, the number of samples is selected such that a spectrum only at a specific frequency is output, and the square of an output value is calculated to eliminate the complex number generated by the arithmetic operation so that only a real number can be output to make the processing easy. Note that the DTMF signal is a mixed wave of one frequency selected from four low-frequency components and one frequency selected from four high-frequency components, as shown in FIG. 2, and is represented by a mixed wave in a total of 16 combinations. Hence, when the DTMF signal is Fourier-transformed into a signal on the frequency axis, each of the two, high- and low-frequency components contained in the DTMF signal is represented by a peak value at one point. The DSP 23 can recognize and detect the type of DTMF signal from the combination of two frequencies corresponding to the peaks.

However, for the above-described method using the DSP 23, a program for executing the Goertzel algorithm must be created. In addition, causing the CPU 22 and DSP 23 to execute the Goertzel algorithm requires to prepare a number of ROMs or RAMs or a large-capacity memory in the DSP 23 and also requires to change the CPU 22 to a processor compatible to high-speed operation. These pose a serous problem in integration and cost reduction of the DTMF signal receiving section and also increase the power consumption.

FIG. 4 shows the arrangement of another conventional key telephone system. In this key telephone system, a main apparatus 1B has a tone signal generator 18. The same reference numerals as in FIG. 1 denote the same parts in FIG. 4, and a detailed description thereof will be omitted.

The tone signal generator 18 is connected to a TSW 13 and control section 14 and time-divisionally generates a tone signal formed from a plurality of kinds of waveforms in accordance with an instruction from the control section 14. The tone signal is selectively sent to extension terminals T1 to Tm by the TSW 13.

To time-divisionally generate a tone signal, the tone signal generator 18 stores data in a ROM 181, as shown in FIG. 5, and extracts data therefrom.

The ROM 181 has continuous areas for storing data of waveforms #1 to #n−1. The areas have the same size of m bytes. Each area stores the amplitude value data of the waveform to be generated. One waveform is generated by reading the m-byte data in accordance with the order from #1 to #n−1.

The tone signal generator 18 also has a counter 182 for waveform number switching and a counter 183 for data number switching. More specifically, in the tone signal generator 18, data represented by an address value obtained by adding, by an adder 184, an upper bit output from the counter 182 and a lower bit output from the counter 183 is extracted from the ROM 181 and output.

The operation in the tone signal generator 18 will be described. The counter 182 counts from 0. When the count value reaches n−1, it returns to 0, and simultaneously, the value of the counter 183 is incremented by one. The counter 183 also counts from 0, and when the count value reaches m−1, it returns to 0. The adder 184 adds the output value from the counter 182 as an upper bit and the output value from the counter 183 as a lower bit to generate an address value and gives it to the ROM 181. When such operation is continued, the waveform data are output from the ROM 181 one by one whereby n waveforms are time-divisionally output.

However, since the waveform data are stored in the ROM 181, the circuitry of the tone signal generator 18 becomes bulky, resulting in difficulty in integration. In addition, since predetermined waveform data are stored in the ROM 181, the tone signal generator 18 cannot flexibly cope with a change in frequency and amplitude of a waveform, a change in data compression scheme, and switching between 2-frequency addition and 2-frequency alternating in an output waveform. To solve these problems, the tone signal generator 18 must be inevitably modified in design of the ROM 181, resulting in an increase in cost.

BRIEF SUMMARY OF THE INVENTION

It is an object of the present invention to provide a tone signal receiving apparatus, tone signal transmitting apparatus, and tone signal transmitting/receiving apparatus which can realize downsizing and reduction in cost and power consumption by integration using a simple digital circuit.

More specifically, it is the first object of the present invention to provide a tone signal receiving apparatus capable of suppressing an increase in circuit scale, reducing the cost, and forming a one-chip structure in realizing tone signal discrimination processing by a digital circuit.

It is the second object of the present invention to provide a tone signal transmitting apparatus capable of reducing the memory capacity and also flexibly coping with a change in frequency and amplitude of a waveform, a change in data compression scheme, and switching between 2-frequency addition and 2-frequency alternating in an output waveform.

It is the third object of the present invention to provide a tone signal transmitting/receiving apparatus capable of realizing tone signal transmission and reception processing by a single apparatus while minimizing an increase in circuit scale.

The tone signal receiving apparatus according to the present invention is directed to a tone signal receiving apparatus for executing reception processing of a tone signal generated by arbitrarily combining a plurality of reference frequencies.

In order to achieve the above objects, the apparatus comprises arithmetic processing means for adding a predetermined first reference value for each of the plurality of reference frequencies and a predetermined second reference value for each of the plurality of reference frequencies to calculate an arithmetic value at current time for each of the plurality of reference frequencies, the first reference value being calculated by multiplying the arithmetic value for each of the reference frequencies by a coefficient, which is held in said processing means, before a predetermined period which is n times of sampling periods, wherein n is an arbitrary natural number, the coefficient being determined in accordance with each of the reference frequencies, the second reference value being calculated by subtracting the arithmetic value for each of the reference frequencies from a current tone signal, which is held in said processing means, before 2 times of the predetermined periods, and the arithmetic value being obtained by repeating processing of adding the first reference value and the second reference value a number of times equal to a number of samples corresponding to each of the plurality of reference frequencies.

The apparatus also comprises output value extraction means for extracting an output value equal to or larger than a predetermined threshold value from the product-sum arithmetic values for the respective reference frequencies, which are calculated by the arithmetic processing means, and signal determination means for determining a type of the tone signal on the basis of at least two output values extracted by the output value extraction means.

The processing means comprises subtracting means for subtracting a signal the 2n sampling periods before from the tone signal, adding means for adding an output from the subtracting means to signal before the determined period to output the arithmetic value, first delaying means for delaying an output from the addition means by the determined period, second delay means for delaying an output from the first delay means by the determined periods and outputting the value to the subtracting means, and multiplication means for multiplying the output from the first delay means by the coefficient corresponding to the reference frequency and outputting the value to the addition means, and also comprises a memory circuit which stores a number of samples and coefficient corresponding to each of the plurality of reference frequencies, and arithmetic control means for sequentially reading out and outputting each number of samples and coefficient from the memory circuit every time arithmetic operation for one reference frequency is ended, and giving the coefficient to the multiplication means to execute arithmetic processing a number of times equal to the number of samples.

According to this arrangement, a product-sum arithmetic device which constructs the Goertzel algorithm by a digital circuit is used to discriminate a tone signal. This product-sum arithmetic device has a feedback loop structure in which the first reference value for each of the plurality of reference frequencies of the tone signal before the determined period and the second reference value for each of the plurality of reference frequencies of the tone signal before 2 times is the determined period are added to calculate product-sum arithmetic values at the current time for each of the reference frequencies a number of times equal to the number of samples for each of the reference frequencies. When appropriate numbers of samples and coefficients corresponding to all reference frequencies possibly contained in the tone signal are ensured, the apparatus can cope with an arbitrary frequency contained in an actual tone signal without requiring any extra dedicated circuit. When at least two output values equal to or larger than the predetermined threshold value are extracted for the product-sum arithmetic values obtained by the product-sum arithmetic device, a frequency contained in the tone signal can be detected, and the type of tone signal can be determined on the basis of the detection result. That is, tone signal detection processing is divisionally executed by the respective digital circuits so that DTMF signal detection processing equivalent to the conventional processing using a codec section and processing using a DSP can be realized.

For this reason, when the product-sum arithmetic device having the Goertzel algorithm constructed by a digital circuit is used, creation of a program for executing the Goertzel algorithm and a large-capacity memory for storing the program are unnecessary. In addition, when the tone signal detection processing is divisionally executed by the respective digital circuits, the process capacity of one digital circuit can be lower. Hence, an increase in circuit scale can be suppressed, allowing integration and cost reduction.

According to the present invention, there is also provided a tone signal transmitting apparatus for time-divisionally generating a tone signal formed from a plurality of types of waveforms, comprising amplitude information generation means, having a memory whose information contents are rewritable by an external control signal, for sequentially outputting a plurality of types of amplitude information written in the memory, frequency information generation means, having a memory whose information contents are rewritable by an external control signal, for sequentially outputting a plurality of types of frequency information written in the memory, sine wave generation means for outputting a sine wave signal as the tone signal on the basis of amplitude information and frequency information output by the amplitude information generation means and the frequency information generation means, and reset means for resetting the sine wave generation means at a predetermined interval to stabilize the sine wave signal output for the sine wave generation means.

According to this arrangement, instead of having a memory storing waveform information, the memory which store the amplitude information and the memory which store the frequency information, are used, when the plurality of types of amplitude information and the plurality of types of frequency information stored in these memories are sequentially read out, a sine wave signal to be sent as a tone signal is generated. For this reason, the memory used in the entire apparatus can be made small. In addition, the waveform to be generated can easily be changed by rewriting the frequency information and amplitude information in the memories on the basis of an external control signal. In generating a waveform, the waveform changes due to a calculation error. However, the sine wave output can be stabilized by resetting the sine wave generation means at a predetermined interval.

In the above arrangement, the reset means resets the sine wave generation means when the sign of the sine wave signal output from the sine wave generation means changes from + to − after the elapse of a predetermined period.

According to this arrangement, instead of resetting the sine wave generation means immediately after the elapse of the predetermined period, it is reset after the waveform changes from + to −. Hence, the sine wave generation means can be smoothly reset without interrupting the output waveform.

In the above arrangement, the apparatus further comprises rectangular processing means for selectively deriving the sine wave signal output from the sine wave generation means or the amplitude information output from the amplitude information generation means using an output selector for switching in accordance with an external control signal so as to selectively replace an amplitude value of the sine wave signal output from the sine wave generation means with a fixed value.

This arrangement enables control to determine whether the sine wave signal is to be converted into a rectangular wave signal by external control. When a sine wave can be generated using an amplitude value after rectangular processing by selectively replacing the amplitude value of the sine wave signal output from the sine wave generation means the fixed value by the output selector, the amplitude value information storage device for rectangular processing can be omitted.

In the above arrangement, the apparatus further comprises addition/alternating processing means, the addition/alternating processing means comprising an adder for adding the sine wave signal output from the sine wave generation means and an output from the rectangular processing means, an alternating processor for alternately selectively outputting an output from the sine wave generation means and an output from the rectangular processing means at a predetermined period, and an output selector for selectively deriving an output from the adder and an output from the alternating processor on the basis of an external control signal.

According to this arrangement, with the output selector for selectively deriving the output from the adder or the output from the alternating processor on the basis of an external control signal, addition processing and alternating processing can easily be switched in accordance with the tone signal to be generated.

In the above arrangement, the apparatus further comprises compression means, capable of switching between a first compression rule and a second compression rule for different compression schemes on the basis of an external control signal, for selectively compressing an output from the addition/alternating processing means on the basis of the first compression rule or the second compression rule.

According to this arrangement, the compression scheme for the tone signal to be generated can be changed anytime in accordance with an external instruction.

According to the present invention, there is also provided a tone signal transmitting/receiving apparatus for receiving and processing a tone signal formed by arbitrarily combining a plurality of reference frequencies within a predetermined band and generating and transmitting a tone signal having a desired frequency, comprising addition means for adding a predetermined first reference value for each of the plurality of reference frequencies and a predetermined second reference value for each of the plurality of reference frequencies within the band of the tone signal to calculate a product-sum arithmetic value at current time for each of the plurality of reference frequencies, first delay means for delaying an output value from the addition means by n (n is an arbitrary natural number) sampling periods, second delay means for delaying an output value from the first delay means by the n sampling periods, multiplication means for multiplying the output from the first delay means by a coefficient determined in accordance with a reference frequency to calculate the first reference value for each of the reference frequencies, and subtraction means for calculating the second reference value from an output value from the second delay means, wherein in a tone signal transmission processing mode, the output value from the second delay means is set to an initial amplitude value determined in accordance with a frequency of a tone signal to be generated, a coefficient determined in accordance with the frequency of the tone signal to be generated is given to the multiplication means, and the second reference value is generated by the subtraction means by inverting the output value from the second delay means, and in a tone signal reception processing mode, an input signal is input to the subtraction means, the product-sum arithmetic value for each of the reference frequencies the 2n sampling periods before is subtracted from the input signal to calculate the second reference value for each of the reference frequencies, and the coefficient determined in accordance with the reference frequency is given to the multiplication means.

In this arrangement, in the tone signal transmission processing mode, the first reference value obtained by multiplying the product-sum arithmetic value the n sampling periods before by the coefficient determined in accordance with the frequency of the desired tone signal and the second reference value obtained by inverting the product-sum arithmetic value the 2n sampling periods before are added to obtain the tone signal to be transmitted. In the tone signal reception processing mode, product-sum arithmetic processing of adding the first reference value obtained for each of the reference frequencies by multiplying the product-sum arithmetic value for each of the reference frequencies the n sampling periods before by the coefficient determined in accordance with the reference frequency and the second reference value obtained for each of the reference frequencies by subtracting the product-sum arithmetic value for each of the reference frequencies the 2n sampling periods before from the current input signal is repeatedly executed for the respective reference frequencies. That is, the product-sum arithmetic device which constructs the Goertzel algorithm by a digital circuit is shared by tone signal transmission processing and tone signal reception processing. In accordance with the tone signal transmission processing mode or tone signal reception processing mode, the coefficient and parameter values are selectively given to the subtractor, multiplier, and second delay element in the product-sum arithmetic device.

Hence, according to the above arrangement, the product-sum arithmetic device need not be separately prepared for tone signal transmission processing and tone signal reception processing. In addition, in the tone signal transmission processing mode, a tone signal having a desired frequency can be generated only by setting the output value from the second delay element in the product-sum arithmetic device to the initial amplitude value determined in accordance with the frequency of the tone signal to be generated, giving the coefficient determined in accordance with the frequency of the tone signal to be generated to the multiplier, and generating the second reference value by inverting the output value from the second delay element by the subtractor. In the tone signal reception processing mode, a plurality of frequency spectra including each of the reference frequency as the center frequency can be detected from an input signal only by giving the input signal to the subtractor, subtracting the product-sum arithmetic value for each of the reference frequencies the 2n sampling periods before from the input signal to calculate the second reference value for each of the reference frequencies, and giving the coefficient determined in accordance with the reference frequency to the multiplier. The type of tone signal can be determined on the basis of the detection result. For this reason, the circuit scale can be reduced, and downsizing and reduction of cost and power consumption by integration can easily be realized. In addition, it is convenient because the tone signal receiving apparatus or tone signal transmitting apparatus can be selectively used in a single apparatus, as needed.

According to the present invention, the apparatus further comprises a first selector for switching between execution and stop of processing of setting the output value from the second delay means to the initial amplitude value determined in accordance with the frequency of the tone signal to be generated in accordance with the tone signal transmission processing mode, a second selector for switching the coefficient to be given to the multiplication means in accordance with the tone signal transmission processing mode or the tone signal reception processing mode, and a third selector for switching between execution and stop of processing of giving the input signal to the subtraction means in accordance with the tone signal transmission processing mode or the tone signal reception processing mode. The first, second, and third selectors alternately switch at a predetermined period.

With this arrangement, when the first, second, and third selectors are set to alternately switch at a predetermined period, switching control can be automatically executed without manual operation.

According to the present invention, the apparatus further comprises peak extraction means for, in the tone signal reception processing mode, extracting a peak value equal to or larger than a predetermined threshold value from the product-sum arithmetic values calculated by the addition means for the respective reference frequencies, and signal determination means for determining a type of the tone signal on the basis of at least two peak values extracted by the peak extraction means.

According to this arrangement, the type of received tone signal can be determined from two frequencies of the frequency spectra detected from the product-sum arithmetic values obtained by the product-sum arithmetic device, whose peak values are equal to or larger than the threshold value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A and 7B are views for explaining the conversion scheme of a compression/linear conversion section shown in FIG. 6;

FIG. 18 is a block diagram schematically showing another example of a product-sum arithmetic circuit prepared in the arithmetic processing section shown in FIG. 6;

FIG. 21 is a block diagram schematically showing detailed circuit examples of a storage section and sine wave generation section shown in FIG. 20;

FIG. 27 is a block diagram schematically showing a key telephone system to which the second embodiment is applied;

FIG. 28 is a block diagram schematically showing a tone signal transmitting/receiving apparatus according to the third embodiment of the present invention;

FIG. 29 is a block diagram schematically showing a detailed circuit example of an arithmetic processing section shown in FIG. 28; and FIG. 30 is a view showing a switching timing set in a selector shown in FIG. 29.

DETAILED DESCRIPTION OF THE INVENTION

The embodiments of the present invention will be described below in detail with reference to the accompanying drawing.

First Embodiment

Figure 6:
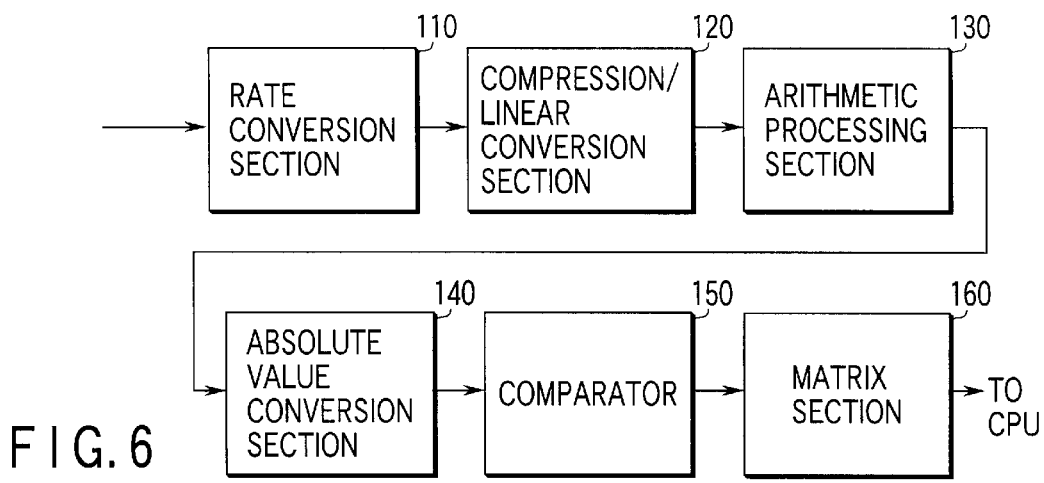
FIG. 6 is a block diagram schematically showing a tone signal receiving apparatus according to the first embodiment of the present invention.

FIG. 6 is a block diagram schematically showing a tone signal receiving apparatus according to the first embodiment of the present invention.

As shown in FIG. 6, the tone signal receiving apparatus according to the first embodiment comprises a rate conversion section 110, compression/linear conversion section 120, arithmetic processing section 130, absolute value conversion section 140, comparator 150, and matrix section 160.

The rate conversion section 110 is connected to a voice bus (PCMHW) (not shown). The rate conversion section 110 extracts one of a plurality of channels multiplexed on the voice bus at one frame period (e.g., 125 $\mu$s) and lowers the rate to form continuous data. That is, the rate conversion section 110 reproduces a PCM signal whose value changes at a predetermined period.

The compression/linear conversion section 120 receives the PCM signal output from the rate conversion section 110. This PCM signal is compressed by one of two kinds of compression schemes ($\mu$-255 rule and A rule) shown in FIGS. 7A and 7B. Thus, the compression/linear conversion section 120 expands the PCM signal output from the rate conversion section 110 in accordance with the conversion scheme shown in FIG. 7A or 7B to restore a linear PCM signal.

The arithmetic processing section 130 executes a product-sum arithmetic operation (to be described later in detail) for each of a total of eight frequencies possibly contained in a DTMF signal using the PCM signal at the current time, a PCM signal one sampling period before, and a PCM signal two sampling periods before, which are supplied from the compression/linear conversion section 120. An arithmetic value obtained by the arithmetic processing section 130 is supplied to the absolute value conversion section 140.

The absolute value conversion section 140 calculates the absolute value of the output value from the arithmetic processing section 130.

The comparator 150 extracts an output value equal to or larger than a predetermined threshold value from the output value from the absolute value conversion section 140 and outputs the value to the matrix section 160. The matrix section 160 determines the type of DTMF signal, i.e., which dial key on the telephone set is pressed by the user, on the basis of at least two output values from the comparator 150 and sends the determination result to a CPU (not shown). Since the arithmetic value by the arithmetic processing section 130 can be a positive or negative value, it must be converted into an absolute value by the absolute value conversion section 140.

A detailed circuit example of the arithmetic processing section 130 will be described next with reference to FIG. 8. The operation of the arithmetic processing section 130 will be described with reference to FIGS. 9A to 9C.

Figure 8:
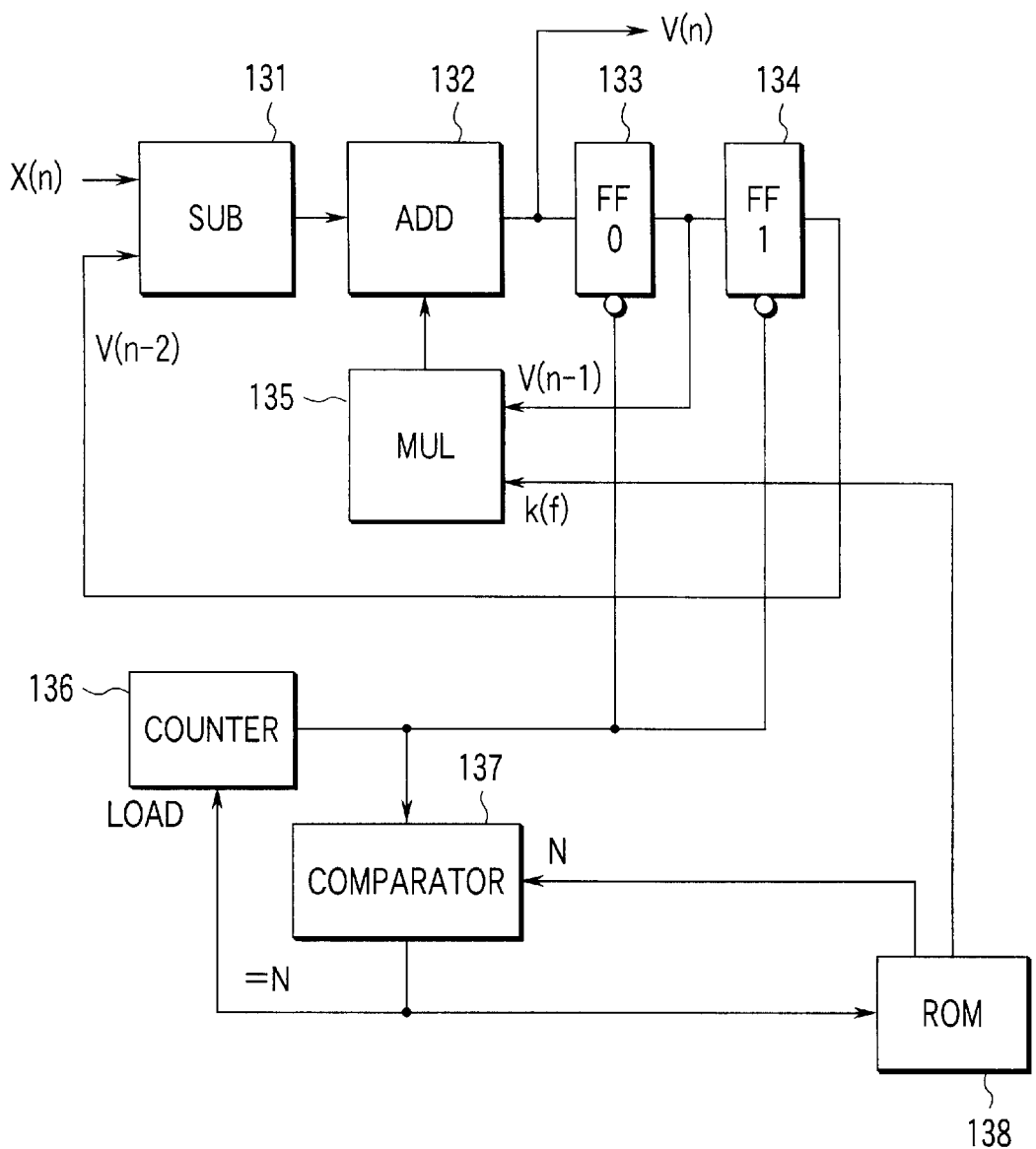
FIG. 8 is a block diagram schematically showing a detailed circuit example of an arithmetic processing section shown in FIG. 6.

Referring to FIG. 8, the product-sum arithmetic circuit in the arithmetic processing section 130 comprises a subtractor (SUB) 131, adder (ADD) 132, delay element (FF0) 133, delay element (FF1) 134, and multiplier (MUL) 135.

Figure 9:
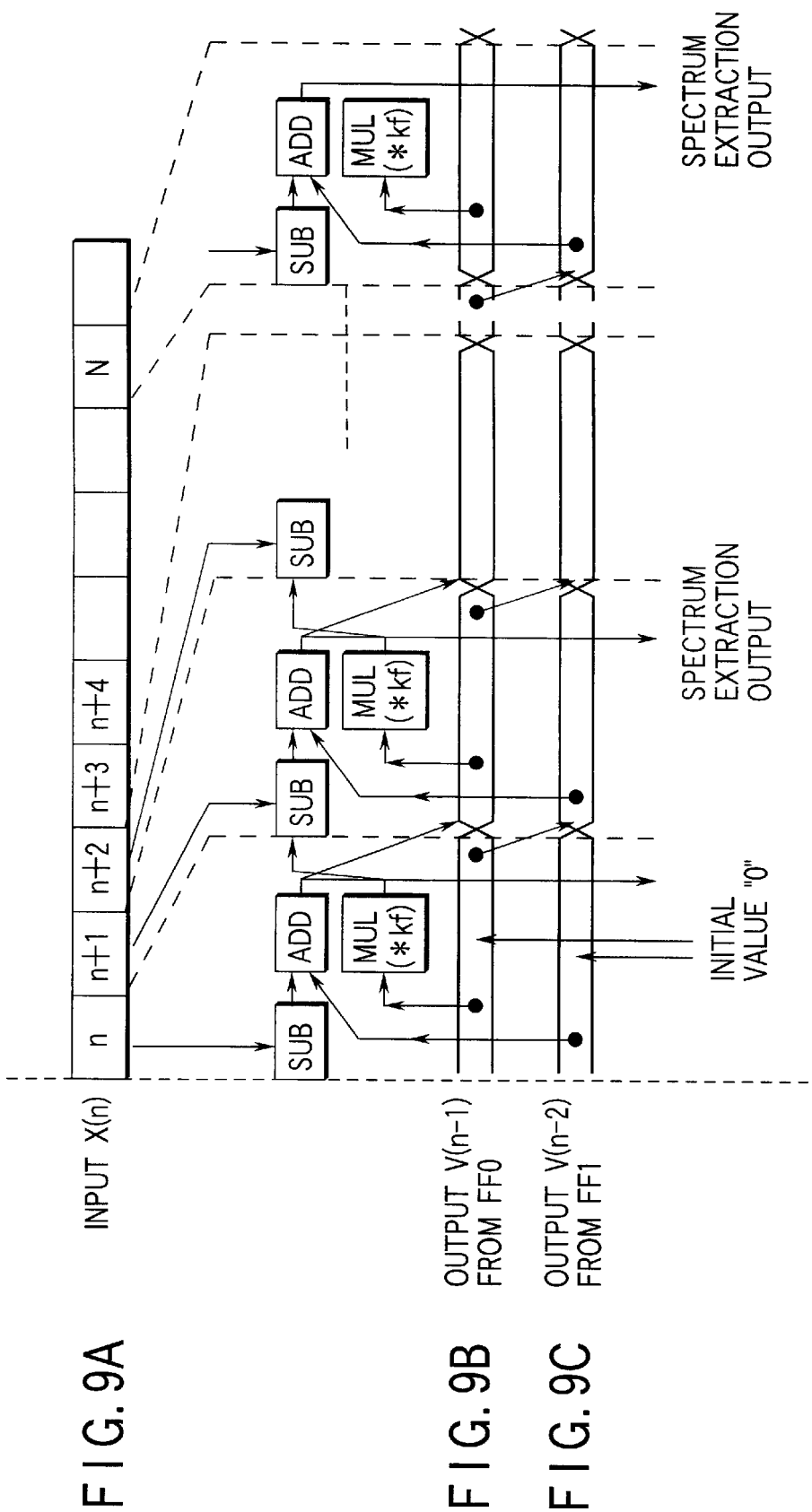
FIGS. 9A to 9C are timing charts for explaining the operation of the arithmetic processing section shown in FIG. 6.

The subtractor 131 subtracts a value V(n−2) two sampling periods before shown in FIG. 9C from an input value X(n) shown in FIG. 9A and outputs the difference to the adder 132. The adder 132 adds the output from the subtractor 131 and the value V(n−1) one sampling period before shown in FIG. 9B. The sum is a new output value V(n), which is held by the delay element 133 and output at an arbitrarily settable sampling period. The output value V(n−1) from the delay element 133 is held by the delay element 134, output at an arbitrarily settable sampling period, and then output to the subtractor 131 as V(n−2). The output value V(n−1) from the delay element 133 is multiplied by a coefficient K(f) corresponding to a frequency contained in the DTMF signal by the multiplier 135 and the product is output to the adder 132.

That is, the output value V(n) is represented by $$V_k(n) = K(f) \times V_k(n-1) - V_k(n-2) + X(n)$$

$K(f) = 2 \times \cos(2\pi k/N)$
$V_k(-1) = 0$
$V_k(-2) = 0$
$n = 0, 1, \ldots N-1$ The above product-sum arithmetic processing is executed N times in one frame period, and the number of times of arithmetic processing is counted by a counter 136. This count value is compared with a count value N set for each frequency by a comparator 137. When the count value counted by the counter 136 matches the count value N, the comparator 137 resets the counter 136 and outputs an address value to a ROM 138.

Figures 10, 11:
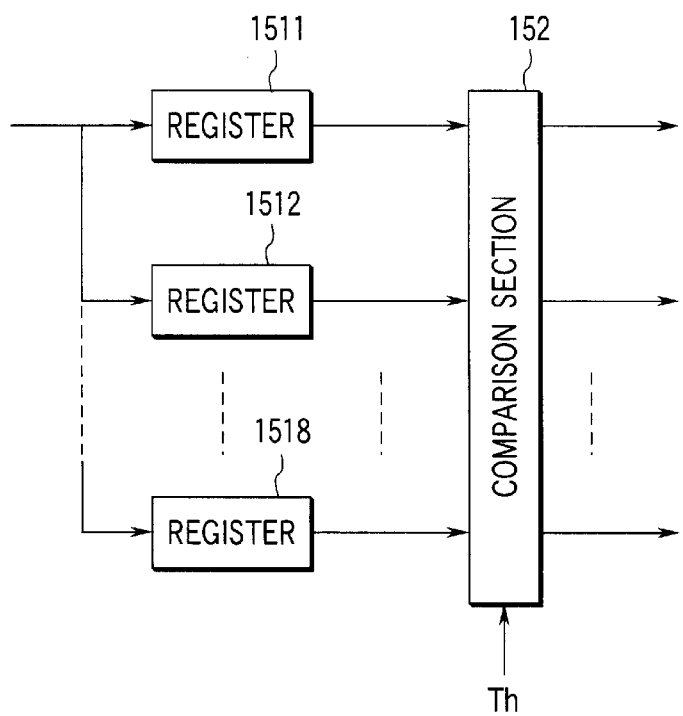
FIG. 10 is a view showing a setting table stored in a ROM shown in FIG. 8.
FIG. 11 is a block diagram schematically showing a detailed circuit example of a comparator shown in FIG. 6.

The ROM 138 has a setting table, in which the number of samples N and the coefficient K(f) corresponding to each of the total of eight frequencies possibly contained in a DTMF signal are stored, as shown in FIG. 10, and the number of samples N and coefficient K(f) are sequentially read out and output on the basis of the address value output from the comparator 137. The readout number of samples N is supplied to the comparator 137, while the coefficient K(f) is supplied to the multiplier 135. Upon receiving a reset signal from the comparator 137, the counter 136 resets the held values in the delay elements 133 and 134.

FIG. 11 is a block diagram showing a detailed circuit example of the comparator 150.

The comparator 150 comprises eight registers 1511 to 1518 and a comparison section 152. Peak values as the arithmetic results for eight frequencies, which are calculated by the arithmetic processing section 130, are stored in the eight registers in units of frequencies in accordance with the order from 1 to 8. The comparison section 152 reads out the peak values from the eight registers 1511 to 1518 in accordance with the order from 1 to 8, compares each value with a threshold value Th, and output a peak value equal to or larger than the threshold value Th to the matrix section 160 as "1". The comparison section 152 also outputs a peak value smaller than the threshold value to the matrix section 160 as "0".

Figures 12, 13:
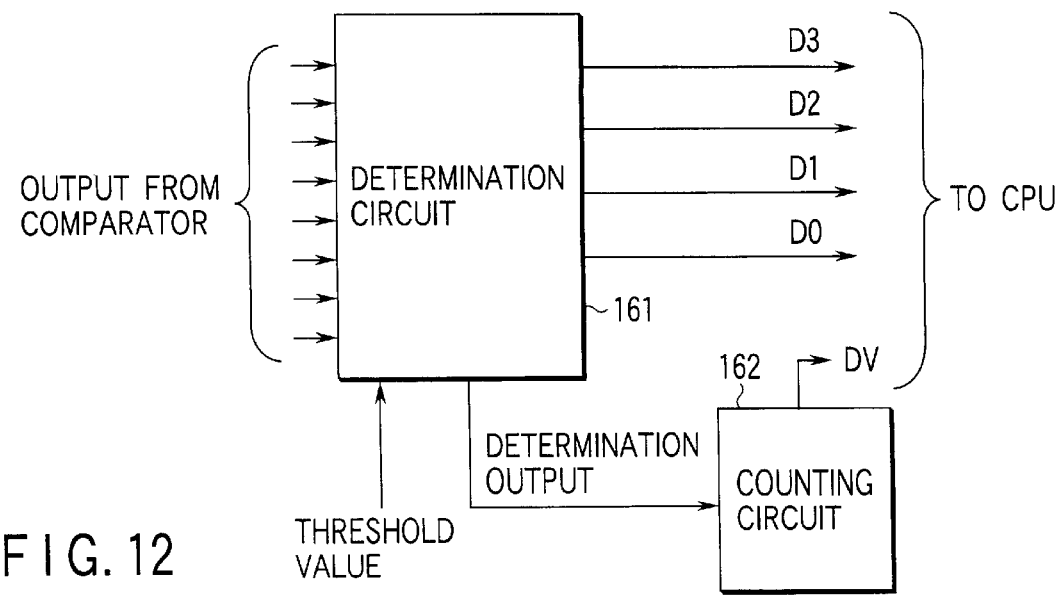
FIG. 12 is a block diagram schematically showing a detailed circuit example of a matrix section shown in FIG. 6.
FIG. 13 is a view showing a discrimination table prepared in a determination circuit shown in FIG. 12.

The matrix section 160 has a determination circuit 161 and counting circuit 162, as shown in FIG. 12. The determination circuit 161 has a discrimination table in which discrimination data, i.e., digit values corresponding to sets of two of all frequencies possibly contained in a DTMF signal are stored, as shown in FIG. 13. The determination circuit 161 reads out a corresponding digit value from the discrimination table on the basis of eight data output from the comparator 150, and outputs it to the CPU (not shown). Eight data output from the comparator 150 include at least two codes representing logic "1". A digit value is expressed by a binary code of four bits (D0 to D3). The determination circuit 161 outputs the determination result to the counting circuit 162. The counting circuit 162 counts the number of times of determination result input and outputs the counting result to the CPU as a digit value DV. The determination circuit 161 also executes determination processing such that the eight data output for the comparator 150 exceeds the threshold value.

The relationship between the above arrangement and the conventionally used Goertzel algorithm will be described next.

In the Goertzel algorithm, when a DTMF signal X(n) is given as an input signal, the DTMF signal X(n) is converted a value $|y_k(N)|^2$ in the frequency axis in accordance with the Fourier transform scheme. This algorithm is basically the Fourier transform, and therefore, two frequency spectra in the frequency components contained in the input signal represent peak values. Thus, the DTMF signal can be recognized, i.e., a pressed dial key can be identified on the basis of the combination pattern of frequency components having the peak values.

Figure 14:
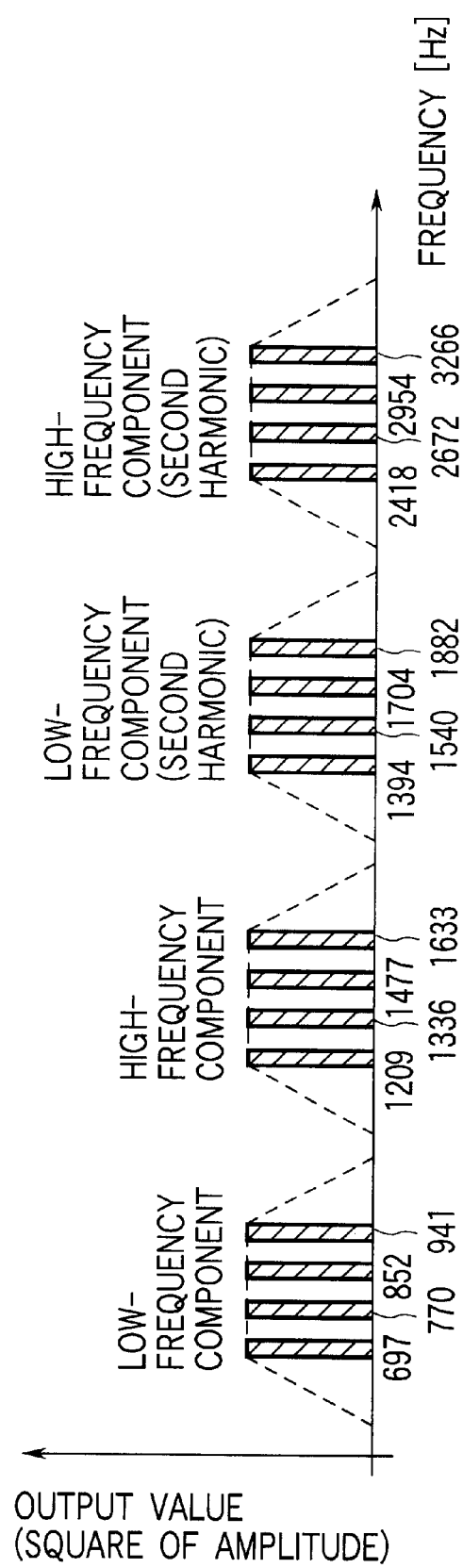
FIG. 14 is a graph showing the frequency spectra of the DTMF signal on the frequency axis.

The DTMF signal contains a total of 16 frequency spectra: a total of eight frequency spectra for eight specific frequencies, i.e., four low-frequency components and four high-frequency components, and eight second harmonics of these eight frequencies, as shown in FIG. 14. In the Goertzel algorithm, to simultaneously appropriately detect only these 16 spectra, the number of samples N is set to 205 points, and second harmonics are set to 201 points. The second harmonics are simultaneously detected to discriminate the signal from a human voice. This is called TALK OFF detection. This TALK OFF can be realized by detecting harmonic components. Since a DTMF signal contains few second harmonics, the spectrum value of a second harmonic is compared with a predetermined threshold value and identified. This embodiment can cope with TALK OFF by changing the value of the coefficient K, allowing circuit scale reduction for TALK OFF.

Figure 15:
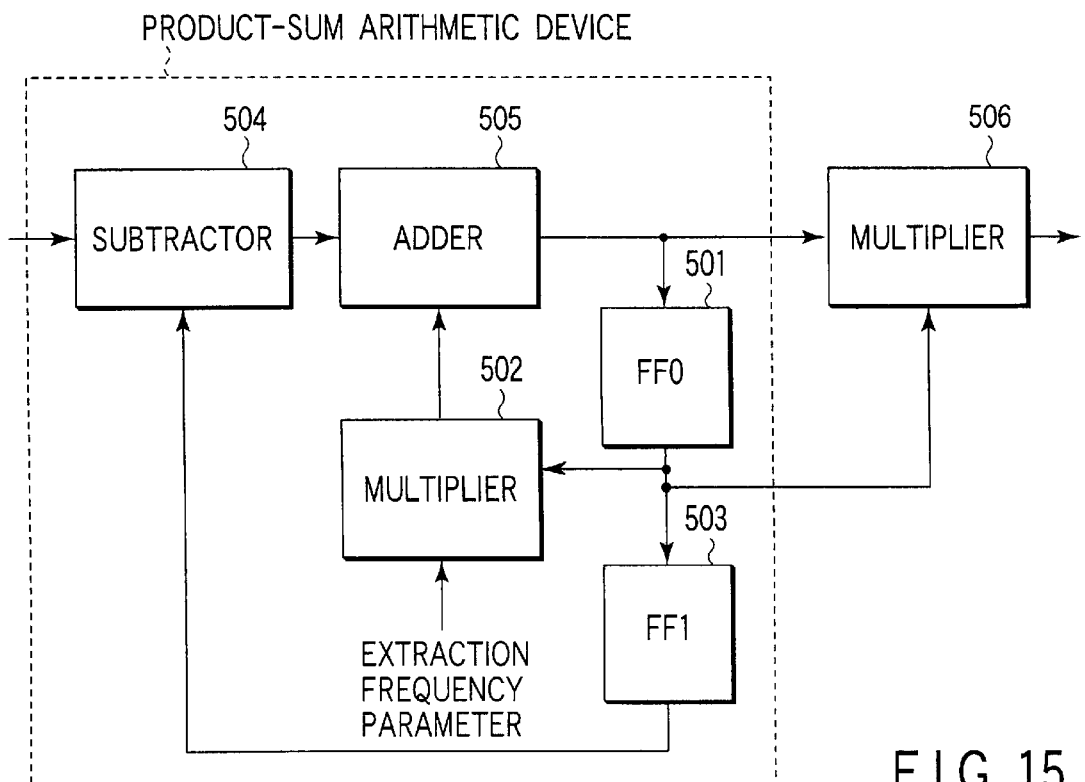
FIG. 15 is a block diagram schematically showing a Goertzel algorithm directly implemented by a digital circuit.

When the Goertzel algorithm is directly implemented by a digital circuit, a feed-forward loop structure as shown in FIG. 15 is normally available.

The product-sum arithmetic device shown in FIG. 15 comprises a delay element 501, multiplier 502, delay element 503, subtractor 504, adder 505, and multiplier 506.

In the product-sum arithmetic device, a product-sum arithmetic value one sampling period before, which is delayed by the delay element 501, is multiplied, by the multiplier 502, by a coefficient determined in accordance with each frequency possibly contained in a DTMF signal, thereby obtaining a first reference value for each frequency. In addition, a product-sum arithmetic value for each of a plurality of frequencies two sampling periods before, which is delayed by the delay element 503, is subtracted from the current input signal by the subtractor 504, thereby obtaining a second reference value for each reference frequency. The first reference value and second reference value are added by the adder 505. The sum is supplied to the multiplier 506. The multiplier 506 controls the multiplier 502 to adjust such that the frequency spectrum extraction result is obtained at the final sampling point.

However, the above feed-forward loop structure requires an extra circuit other than the feed-forward loop.

In this embodiment, the product-sum arithmetic circuit used in the arithmetic processing section 130 has a feedback loop structure including no feed-forward loop structure, in which the Goertzel algorithm is simplified, and peak hold processing is performed. In addition, since the object is to recognize the type of DTMF signal, the accuracy of an output value may be lower. For downsizing, the number of product-sum arithmetic bits is decreased to reduce the circuit scale.

The product-sum arithmetic circuit in the arithmetic processing section 130 executes processing while changing the number of samples and coefficient in units of frequencies and therefore can perform arithmetic operation of a frequency close to a detection frequency. To do this, an optimum number of samples and coefficient K to be used for the arithmetic operation are ensured in advance. The deviation of each frequency must be 3%, i.e., a specification of a currently used analog receiver. However, generally, for the frequency deviation in the feedback loop structure, the lower the frequency is, the larger the bandwidth becomes, and the higher the frequency is, the smaller the bandwidth becomes. For this reason, if the number of samples remains the same, the deviation changes between frequencies. To make uniform the deviations of frequencies, the number of samples is set to about 200 points for a low-frequency component to reduce the bandwidth and to about 100 points for a high-frequency component to increase the bandwidth. Thus for a high-frequency component, an output value can be obtained using 100 points: the value is output in time ½ that required for the arithmetic operation of a low-frequency component. This allows further multiplexing.

Figure 16:
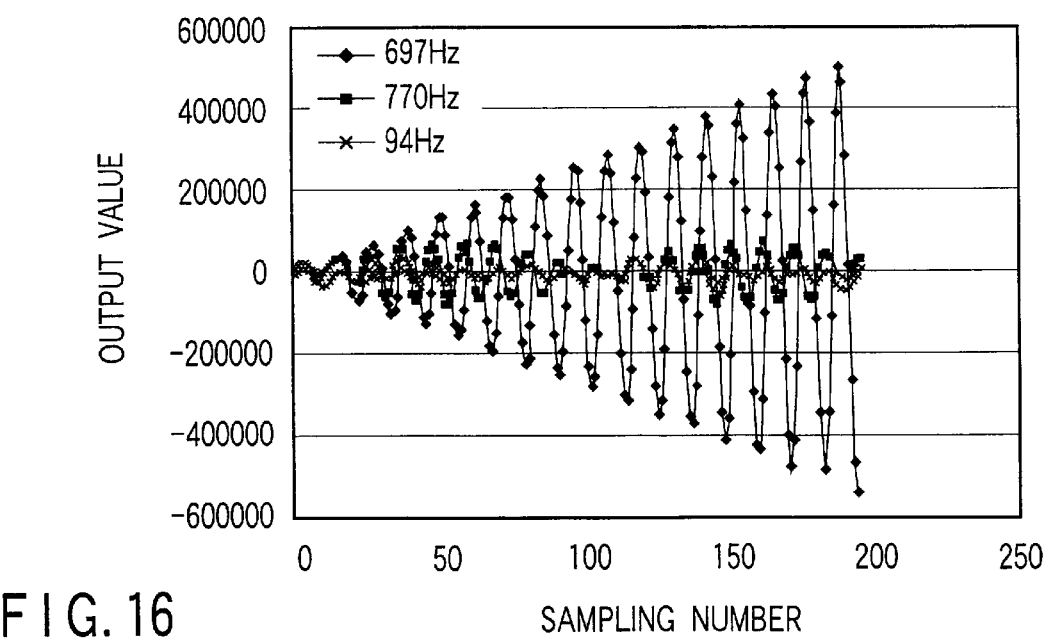
FIG. 16 is a graph showing the output characteristic of the arithmetic processing section shown in FIG. 6.
Figure 17:
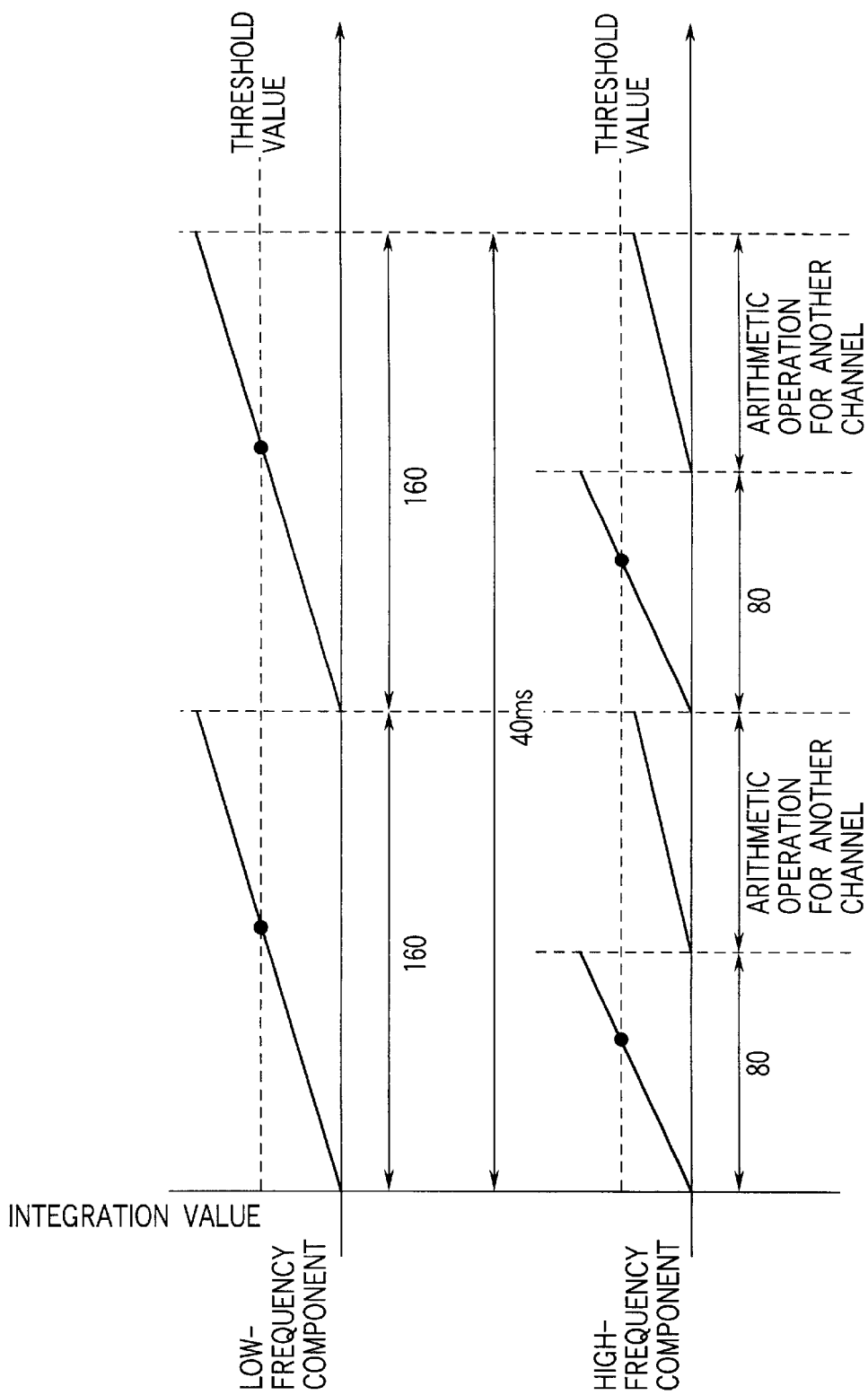
FIG. 17 is a timing chart showing a detection method in the comparator shown in FIG. 6.

FIG. 16 is a graph showing a change in output value from the arithmetic processing section 130 at each frequency when the above method and number of samples are used. As a nature of an input signal, it vibrates and increases the amplitude value at an adapted frequency, while it attenuates at other frequencies. Using this nature, the comparator 150 can detect a value in a shorter time by peak-holding the absolute value of the output value at each frequency and comparing the peak value with a predetermined threshold value, instead of waiting for a result until the arithmetic operation for 200 points is ended, as shown in FIG. 17. In addition, each frequency can be separated without arithmetic operation for 200 points. For this reason, when the arithmetic operation for 160 points is ended, the count is reset to 0, and the arithmetic operation starts from 0. For 200 points, only one arithmetic output is obtained within the detection time of 40 ms. However, for 160 points, two outputs values of arithmetic operation are obtained. When the number of times of arithmetic operation is decreased, the number of times of output increases, and the accuracy increases.

As described above, according to this embodiment, the arithmetic processing section 130 has a product-sum arithmetic circuit which implements the Goertzel algorithm by a digital circuit. In this product-sum arithmetic circuit, product-sum arithmetic processing in which a value obtained by subtracting, from an input signal, a product-sum arithmetic value two sampling periods before as the output from the delay element 134 by the subtractor 131, and a value obtained by multiplying a product-sum arithmetic value one sampling period before as the output from the delay element 133 by a coefficient corresponding to a frequency possibly contented in a DTMF signal by the multiplier 135 are added by the adder 132 is repeatedly executed a number of times equal to the number of samples corresponding to each of the frequencies. For this reason, the circuit can cope with an arbitrary frequency contained in an actual DTMF signal without requiring any extra dedicated circuit. When an output value equal to or larger than a predetermined threshold value is extracted, by the comparator 150, from the arithmetic results by the product-sum arithmetic circuit, the frequency spectrum contained in the DTMF signal can be detected. On the basis of this detection result, the type of DTMF signal can be determined by the matrix section 160. That is, DTMF signal detection processing is divisionally executed by the respective digital circuits so that DTMF signal detection processing equivalent to the conventional processing using a codec section and processing using a DSP can be realized.

For this reason, when the product-sum arithmetic circuit having the Goertzel algorithm as a digital circuit is used, creation of a program for executing the Goertzel algorithm and a large-capacity memory for storing the program are unnecessary. In addition, when the DTMF signal detection processing is divisionally executed by the respective digital circuits such as the arithmetic processing section 130, comparator 150, and matrix section 160, the process capacity of one digital circuit can be lower. Hence, an increase in circuit scale can be suppressed, allowing integration and cost reduction.

The product-sum arithmetic circuit has a feedback loop structure in which the Goertzel algorithm arithmetic operation is simplified and limits numerical value approximation and accuracy in the arithmetic process. Hence, the circuit scale can be made small, and an on-chip system can easily be implemented.

The product-sum arithmetic circuit shown in FIG. 8 has a circuit arrangement for one frequency. However, a circuit arrangement capable of calculating, e.g., eight multiplexed frequencies can also be realized.

Figure 19:
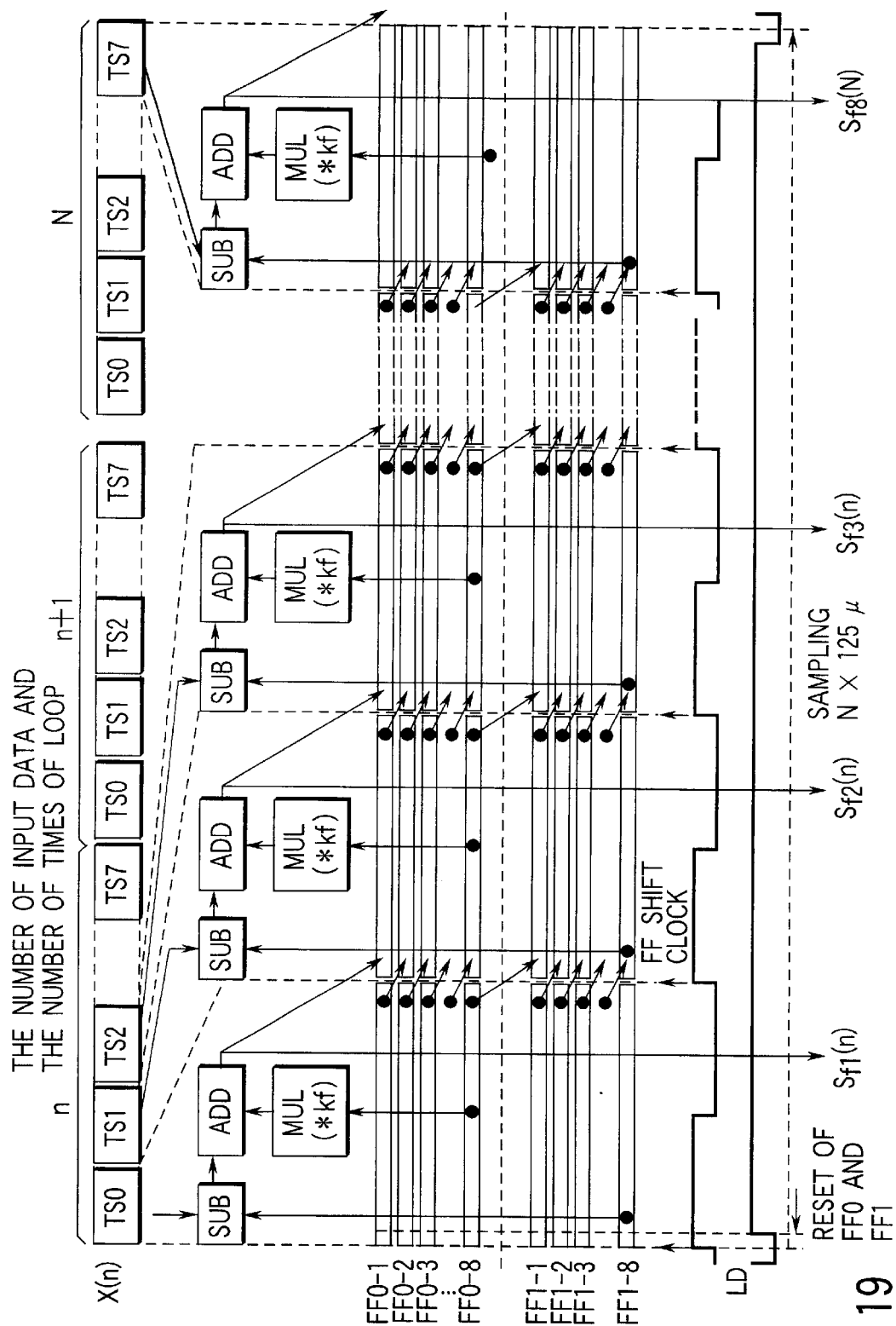
FIG. 19 is a timing chart for explaining the operation of the arithmetic processing section shown in FIG. 18.

FIG. 18 is a circuit block diagram showing the arrangement of the product-sum arithmetic circuit in the arithmetic processing section 130 for executing the multiplex arithmetic operation. FIG. 19 is a timing chart showing the operation. The same reference numerals as in FIG. 8 denote the same parts in FIG. 18, and a detailed description thereof will be omitted.

Referring to FIG. 18, a first delay element group 1330 in which eight delay elements (FF0) 1331 to 1338 are connected in series is provided on the output side of the adder 132, and a second delay element group 1340 in which eight delay elements (FF1) 1341 to 1348 are connected in series is provided on the output side of the first delay element group 1330.

In the first delay element group 1330, data of 8 TSs (TS0 to TS7), which are output from the adder 132, are input to the delay element 1331 and sequentially shifted to the delay element 1338 by 1 TS. The data are delayed by one sampling period as a whole and output to the second delay element group 1340 and multiplier 135. In the second delay element group 1340, the data of 8 TSs (TS0 to TS7) output from the first delay element group 1330 are input to the delay element 1341 and sequentially shifted to the delay element 1348 by 1 TS at a period ⅛ the sampling period. The data are delayed by one sampling period as a whole and output to the adder 132. Note that the delay time set in each delay element in the first delay element group 1330 and second delay element group 1340 can be arbitrarily set in accordance with the frequency.

The subtractor 131 subtracts the output (FF1–8) of the delay element 1348 for the input signal X(n). The adder 132 adds the output from the subtractor 131 and a value obtained by multiplying the output (FF0–8) of the delay element 1338 by the coefficient K(f) by the multiplier 135, and outputs the sum to absolute value conversion section 140 and first delay element group 1330. This arithmetic processing is sequentially time-divisionally executed for the data of 8 TSs a number of times equal to the number of samples N.

In this case, the absolute value conversion section 140, comparator 150, and matrix section 160 on the output side execute time-divisional processing for the data of 8 TSs.

In the above description, the arithmetic processing is executed for the data of 8 TSs. However, this processing can be similarly executed for data which multiplexes another plurality of TSs by preparing delay elements in number equal to the number of TSs in the first delay element group 1330 and second delay element group 1340.

Second Embodiment

The second embodiment of the present invention is related to a tone signal transmitting apparatus for time-divisionally generating a tone signal formed from a plurality of types of waveforms in a key telephone system.

Figure 20:
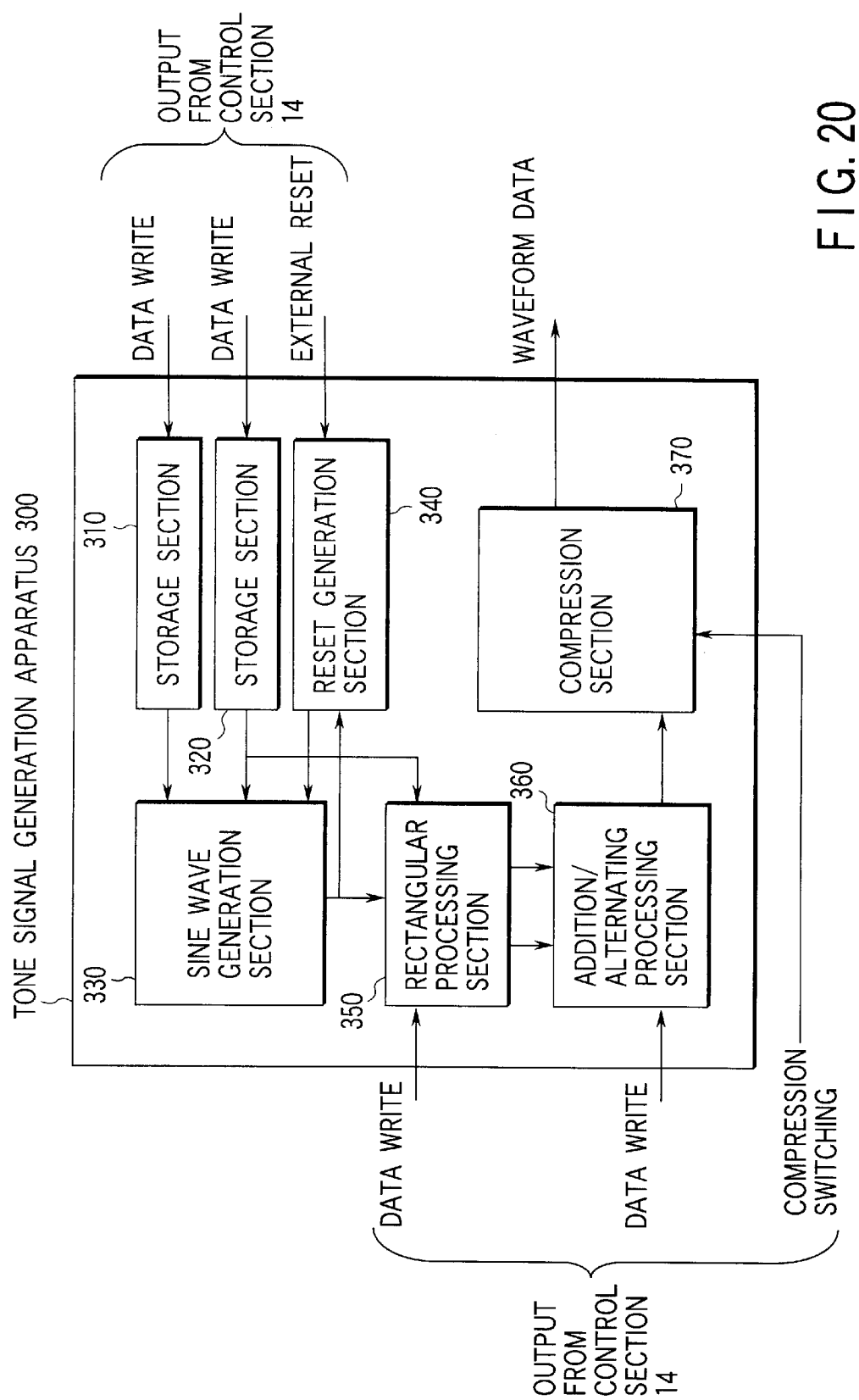
FIG. 20 is a block diagram schematically showing a tone signal transmitting apparatus according to the second embodiment of the present invention.

FIG. 20 is a block diagram showing a tone signal transmitting apparatus according to the second embodiment of the present invention.

A tone signal transmitting apparatus 300 comprises storage sections 310 and 320, sine wave generation section 330, reset generation section 340, rectangular processing section 350, addition/alternating processing section 360, and compression section 370.

As shown in FIG. 21, the storage section 310 stores pieces of frequency information corresponding to 2n sine waves to generate two single frequencies per waveform in accordance with an instruction from an external control section 14 (to be described later). The frequency information stored in the storage section 310 can be rewritten from the control section 14. The storage section 320 stores pieces of amplitude information corresponding to 2n sine waves to generate two single frequencies per waveform in accordance with an instruction from the control section 14. The amplitude information stored in the storage section 320 can also be rewritten from the control section 14.

The sine wave generation section 330 outputs a sine wave signal on the basis of frequency information read out from the storage sections 310 and amplitude information read out from the storage sections 320, in accordance with an instruction from the control section 14. The reset generation section 340 resets the sine wave generation section 330 at a predetermined interval to stabilize the sine wave signal output from the sine wave generation section 330. The rectangular processing section 350 forms a rectangular wave from the sine wave signal output from the sine wave generation section 330 on the basis of amplitude information stored in the storage section 320. The addition/alternating processing section 360 executes addition or alternating processing for the output from the rectangular processing section 350. The compression section 370 can switch between the A rule and the $\mu$ rule for different compression schemes on the basis of a control signal from the control section 14. The compression section 370 selectively compresses the output from the addition/alternating processing section 360 on the basis of the A rule or $\mu$ rule.

The sine wave generation section 330 will be described first. As shown in FIG. 21, the sine wave generation section 330 comprises latches 331, 332, and 333, a subtractor 334, and a multiplier 335.

The principle of sine wave oscillation by the sine wave generation section 330 will be described. As is known, according to the z-transform theory in signal processing, sine wave oscillation can be described by $$y(0)=2\cos\omega y(-1)-y(-2)$$

$\omega=2\pi\cdot$(oscillation frequency)/sampling frequency
initial value $y(-1)=0$
$y(-2)=A\sin\omega$ (A is an amplitude value)

The value $2\cos\omega$ is held by the storage section 320 as amplitude information, and the value $A\sin\omega$ is held by the storage section 310 as frequency information. In the sine wave generation section 330, after a reset signal is received, the value of the latch 333 is set to 0, and the latch 331 is made to hold amplitude information output from the storage section 320. After that, the latch 333 receives the output value from the latch 332 in synchronism with a clock. At the same timing, the latch 331 receives the output value from the latch 333.

The output data value from the latch 333 and frequency information output from the storage section 310 are multiplied by the multiplier 335. The subtractor 334 subtracts the data value from the latch 331 from a product data value as the output from the multiplier 335. The output from the subtractor 334 is received by the latch 332 in synchronism with a clock. At the same timing, the data in the latch 332 moves to the latch 333, and simultaneously, the data in the latch 333 moves to the latch 331. By repeating such operation, single frequency data can be continuously generated.

In the sine wave generation section 330, 2n latches 331 and 333 are cascade-connected to time-divisionally generate data. In the latches 331 and 333, data is shifted to the next stage in accordance with a clock to change stored data contents one by one. Thus, 2n sine wave data are time-divisionally output for one data. The time required to output the first to final sine wave data is defined as one frame.

Figure 22:
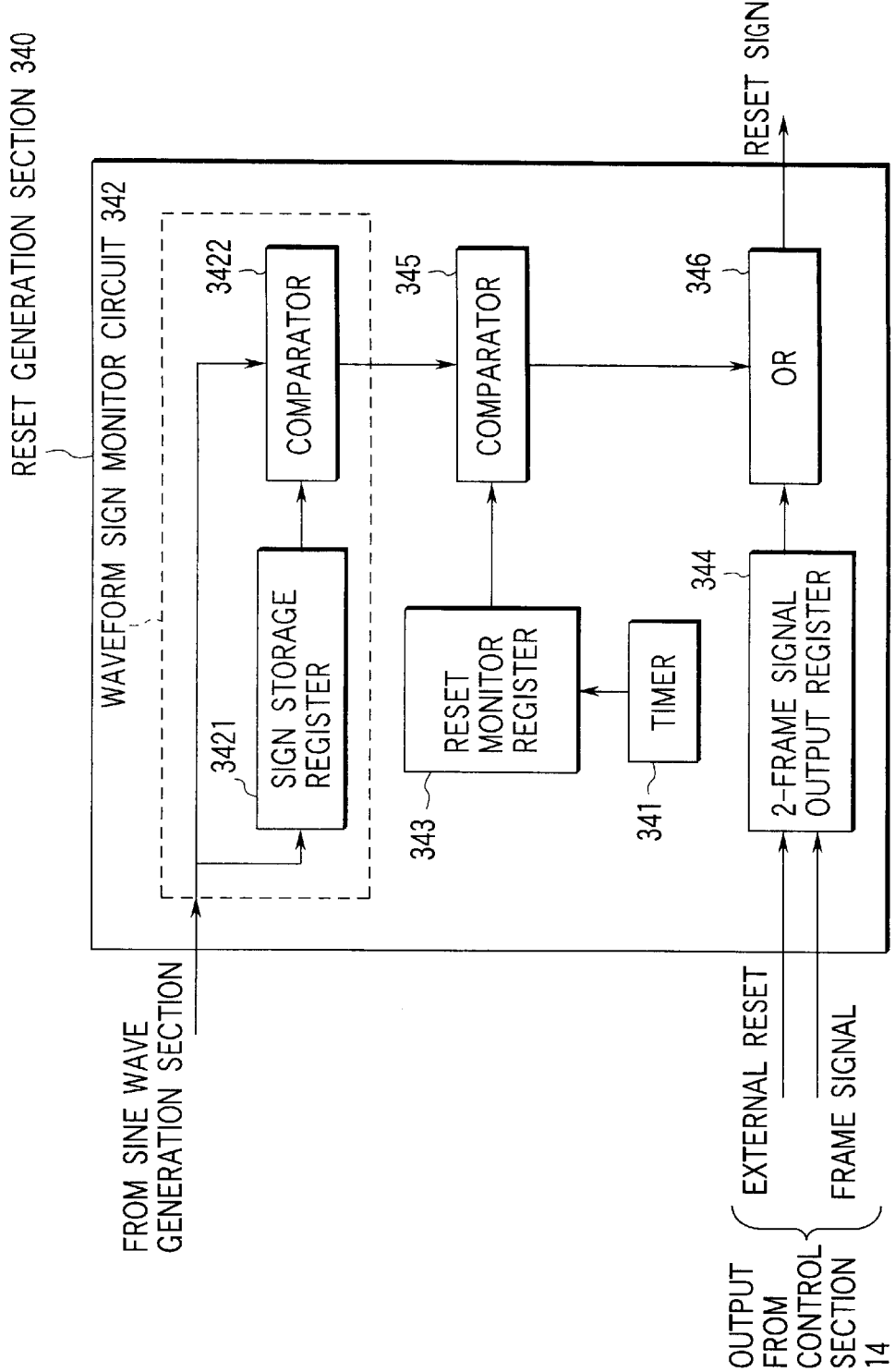
FIG. 22 is a block diagram schematically showing a detailed circuit example of a reset generation section shown in FIG. 20.

FIG. 22 is a circuit block diagram showing the arrangement of the reset generation section 340. The reset generation section 340 comprises a timer 341, a waveform sign monitor circuit 342 for finding a timing when each waveform is to be smoothly restarted after a time-up in the timer, a reset monitor register 343 for storing whether reset is done after a time-up in the timer, a 2-frame signal output register 344 for generating a reset signal for forcibly resetting the sine wave generation section 330 upon receiving an external reset, a comparator 345, and an OR circuit 346.

The operation in the reset generation section 340 will be described. After a time-up in the timer 341, the reset monitor register 343 outputs information representing a time-up, i.e., logic value "1" to one input terminal of the comparator 345. Information representing a determination result from the waveform sign monitor circuit 342 is output to the other input terminal of the comparator 345. The waveform sign monitor circuit 342 receives a sine wave signal generated by the sine wave generation section 330, stores the sign of one frame in a sign storage register 3421. In the waveform sign monitor circuit 342 compares the sign stored in the sign storage register 3421 with the sign of the sine wave signal as a current frame, and outputs logic value "1" to the comparator 345 when the sign of the previous frame is +, and the sign of the current frame is –.

When the two input signals represent logic value "1", the comparator 345 outputs a signal representing logic value "1" to the OR circuit 346. Upon receiving the signal representing logic value "1" by one input terminal, the OR circuit 346 generates a reset signal. When an external reset signal is received, the 2-frame signal output register 344 sends the reset signal to the sine wave generation section 330 through the OR circuit 346 and simultaneously reset the timer 341, so that the timer 341 starts counting after the external reset is canceled.

Figure 23:
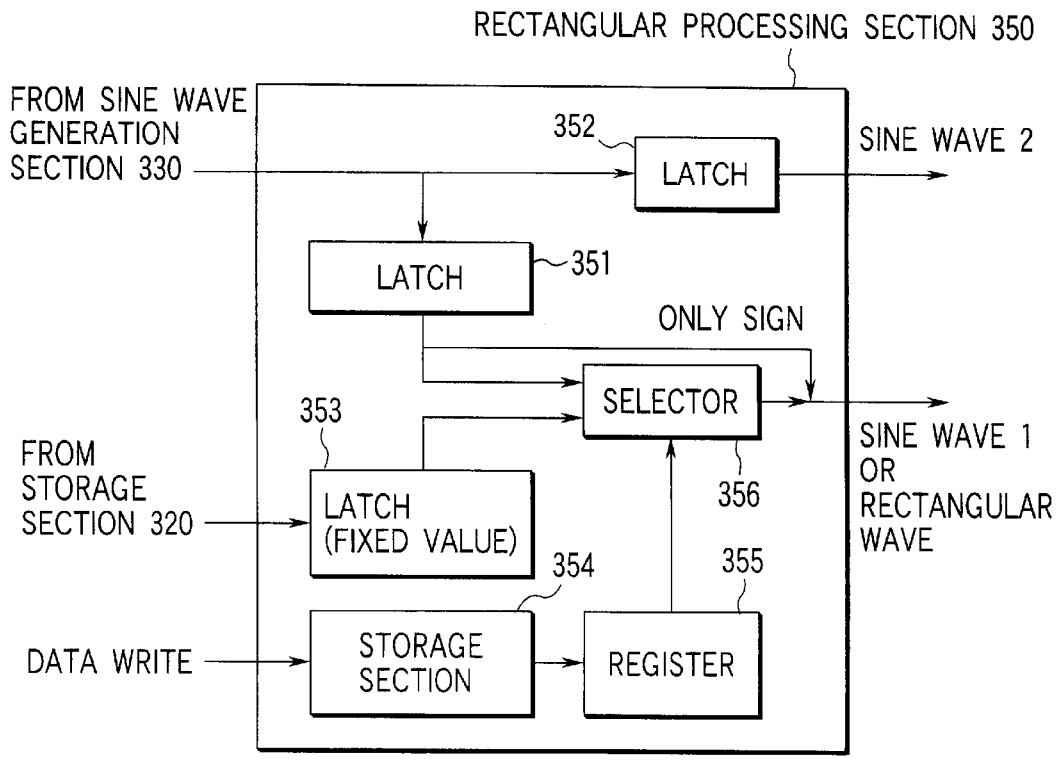
FIG. 23 is a block diagram schematically showing a detailed circuit example of a rectangular processing section shown in FIG. 20.

FIG. 23 is a circuit block diagram schematically showing a detailed circuit example of the rectangular processing section 350.

The rectangular processing section 350 comprises latches 351 and 352 for storing a sine wave signal generated by the sine wave generation section 330, a latch 353 for storing amplitude information generated from the storage section 320 as a fixed value, a storage section 354 and register 355 which store whether a sine wave signal or rectangular wave signal is to be output, and a selector 356 for switching the output in accordance with the register 355. The latches 351 and 352 receive signals at different timings whereby sine wave signal 1 is stored in the latch 351, and sine wave signal 2 is stored in the latch 352. Information stored in the storage section 354 can be rewritten by the control section 14.

Figure 24:
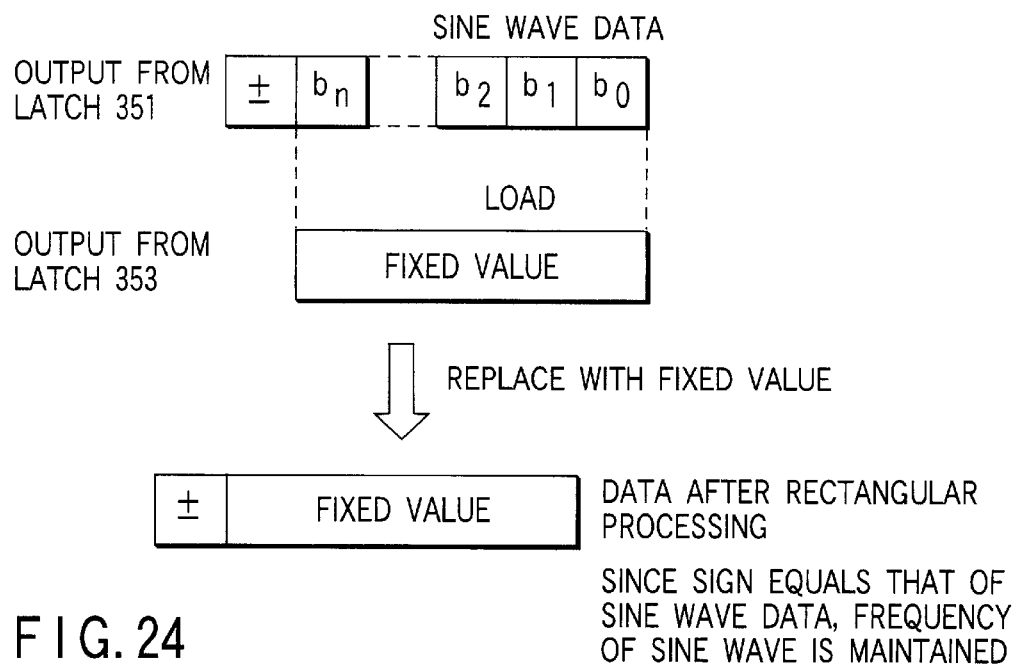
FIG. 24 is a view for explaining the internal operation of the rectangular processing section shown in FIG. 23.

The selector 356 selectively derives sine wave signal 1 stored in the latch 351 or amplitude information for the storage section 320, which is stored in the latch 353. Note that the amplitude information stored in the latch 353 is constant for a sine wave and therefore has a fixed value for one sine wave. To output a sine wave signal, the selector 356 directly selectively derives the output from the latch 351. To output a rectangular wave signal, the selector 356 replaces values other than the sign bit of the output from the latch 351 with the fixed value from the latch 353 and output the value, as shown in FIG. 24. Since the sign changes at the same period as that of the sine wave, and the amplitude value is constant, a rectangular wave is formed. Thus, the rectangular processing section 350 can output both a sine wave and a rectangular wave. The selector 356 is ON/OFF-controlled by the register 355, and information representing whether rectangular processing is to be executed for each tone is stored in the storage section 354. Hence, the register 355 reads the information stored in the storage section 354 and switches the selector 356 in accordance with the tone number.

Figure 25:
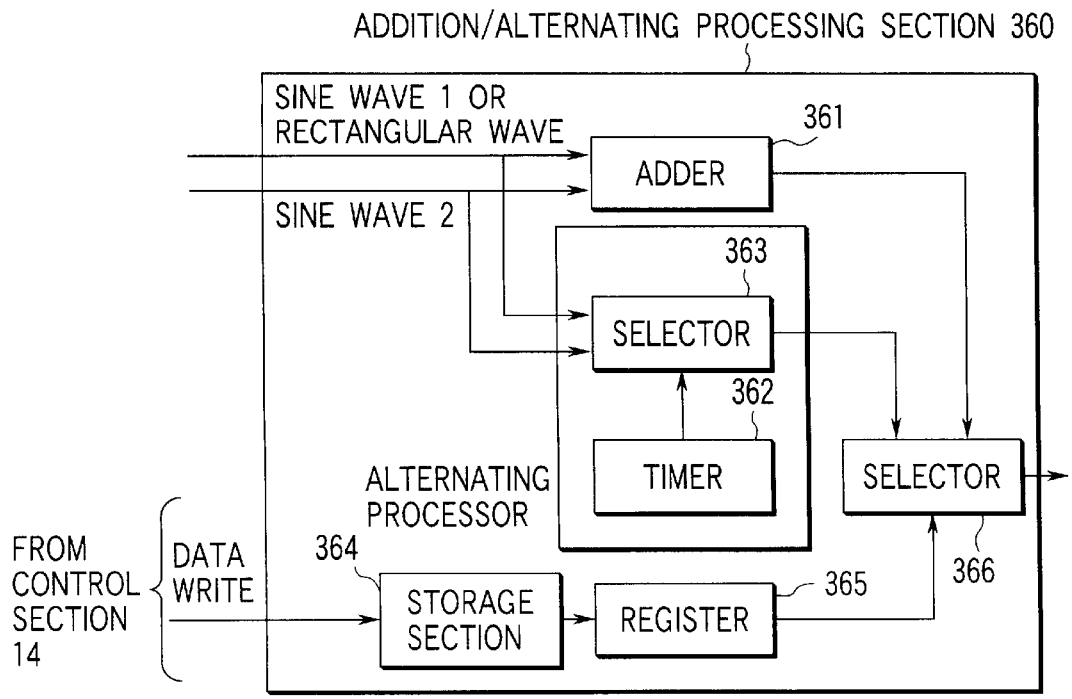
FIG. 25 is a block diagram schematically showing a detailed circuit example of an addition/alternating processing section shown in FIG. 20.

FIG. 25 is a circuit block diagram showing a detailed circuit example of the addition/alternating processing section 360.

The addition/alternating processing section 360 comprises an adder 361 for adding two input signals, a timer 362 and selector 363 for alternating processing, a storage section 364 and register 365 which store information representing which is to be output for each tone, the output from the adder 361 or the output from the selector 363, and a selector 366 for selectively deriving the output from the adder 361 or the output from the selector 363 in accordance with the output from the register 365. Information stored in the storage section 364 can be externally written.

The operation of the addition/alternating processing section 360 having the above arrangement will be described in detail with reference to FIGS. 26A and 26B.

Figure 26A:
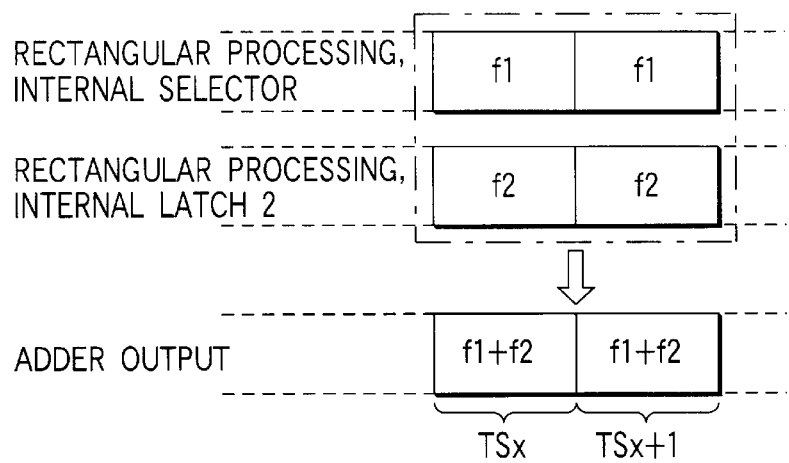
FIGS. 26A and 26B are views for explaining the internal operation of the addition/alternating processing section shown in FIG. 25.
Figure 26B:
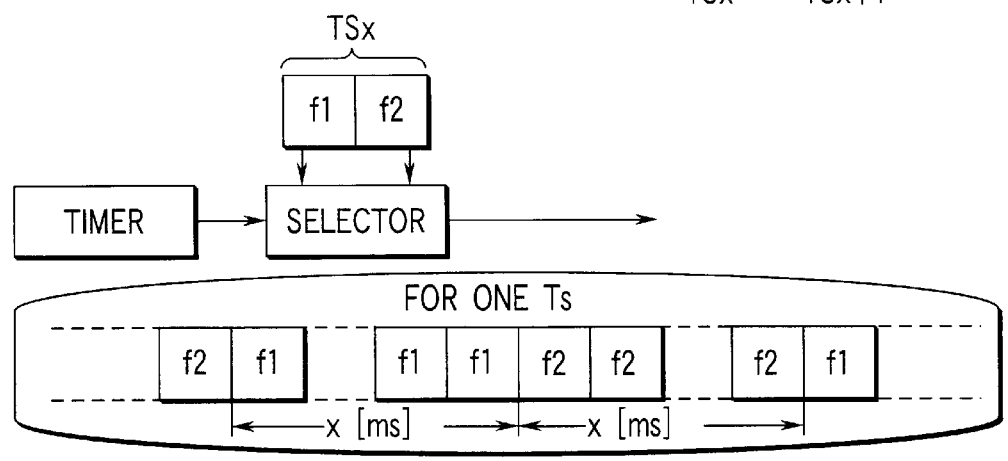

As shown in FIG. 26A, the adder 361 adds sine wave signal 1 (or a rectangular wave signal) and sine wave signal 2 and outputs the sum to the selector 366. Parallel to the adder 361, the selector 363 is executing alternating processing of alternately switching between sine wave signal 1 (or a rectangular wave signal) and sine wave signal 2 at a time interval set in the timer 362 and outputting the signal, as shown in FIG. 26B. The selector 366 selectively derives the output from the adder 361 or the output from the selector 363 in accordance with the output from the register 365. Note that the register 365 reads information stored in the storage section 364 and switches the selector 366 in accordance with the tone number.

An operation of generating one waveform in the tone signal transmitting apparatus will be described next.

The sine wave generation section 330 generates sine wave signal 1 and then sine wave signal 2. The rectangular processing section 350 forms a rectangular wave signal from sine wave signal 1 as needed. The addition/alternating processing section 360 executes alternating processing for the output from the rectangular processing section 350 when an alternating waveform is output, and otherwise, executes addition processing. The compression section 370 compresses the output from the addition/alternating processing section 360.

To generate a single-frequency waveform, the sine wave generation section 330 generates sine wave signal 1 as the necessary single frequency and then oscillates sine wave signal 2 at a frequency of 0 [Hz] and amplitude of 0, the rectangular processing section 350 does not execute rectangular processing, the addition/alternating processing section 360 adds sine wave signal 1 and sine wave signal 2, and the compression section 370 compresses the signal. To generate a rectangular waveform, the storage section 320 is caused to store an amplitude value, the sine wave generation section 330 generates sine wave signal 1 as a single frequency and then oscillates sine wave signal 2 at a frequency of 0 [Hz] and amplitude of 0, the rectangular processing section 350 executes rectangular processing, the addition/alternating processing section 360 adds the rectangular wave signal and sine wave signal 2, and the compression section 370 compresses the signal.

Figure 1:
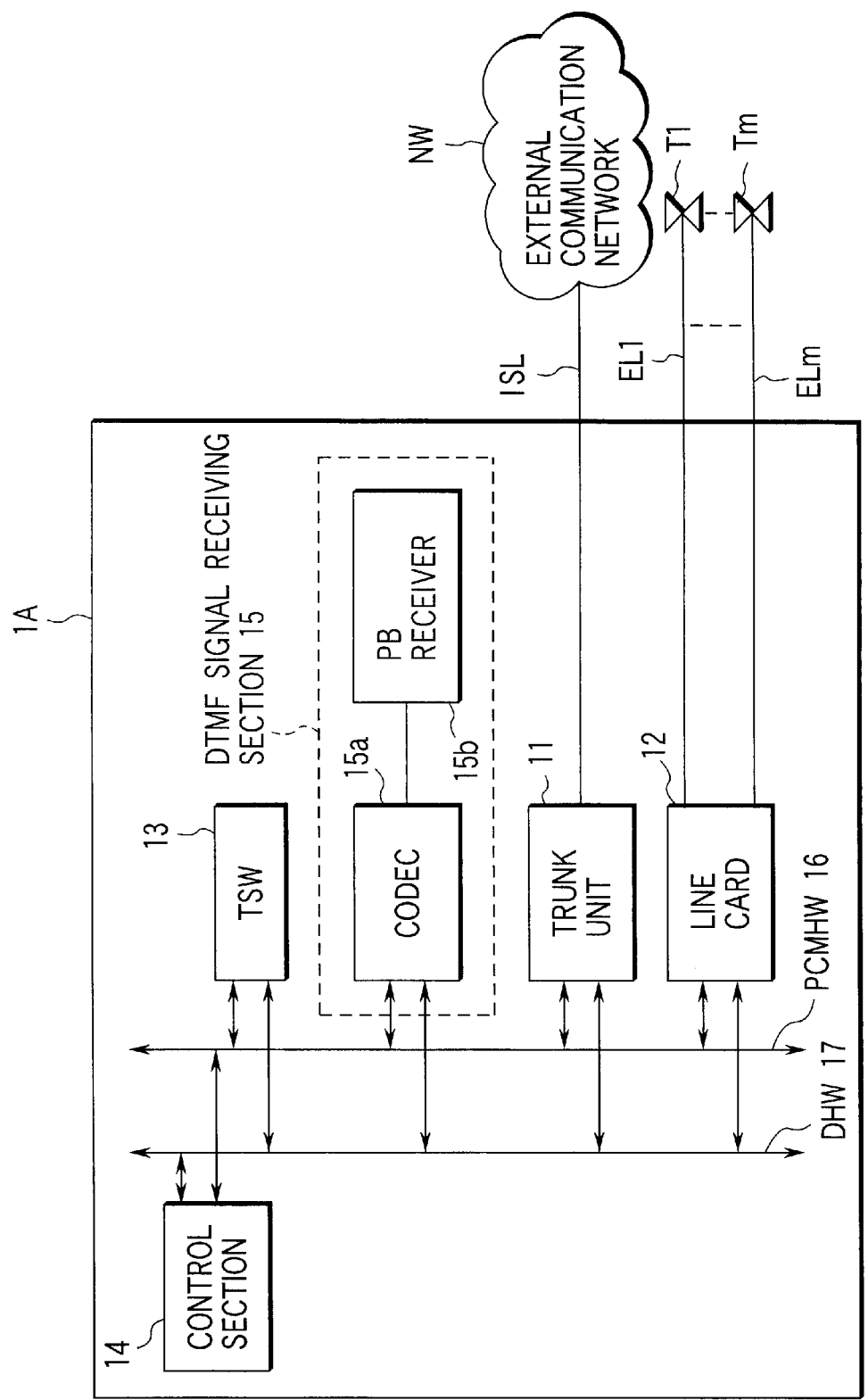
FIG. 1 is a block diagram schematically showing a conventional key telephone system.
Figure 2:
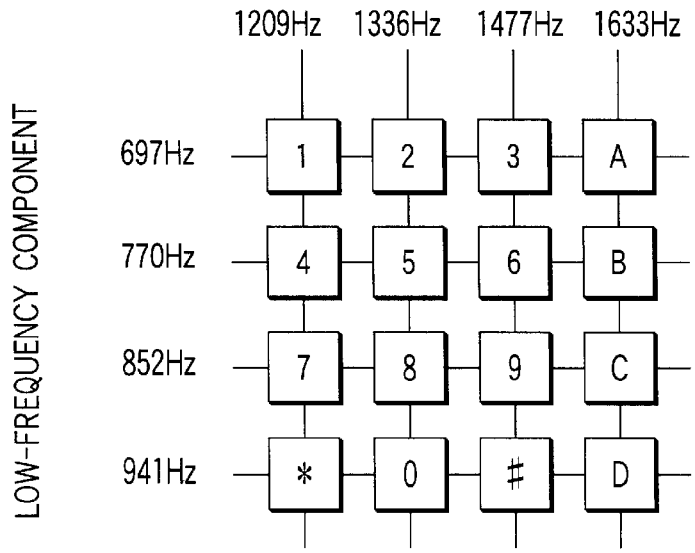
FIG. 2 is a view showing the correspondence between high-frequency components and low-frequency components forming a DTMF signal received by a DTMF signal receiving section shown in FIG. 1.
Figure 3:
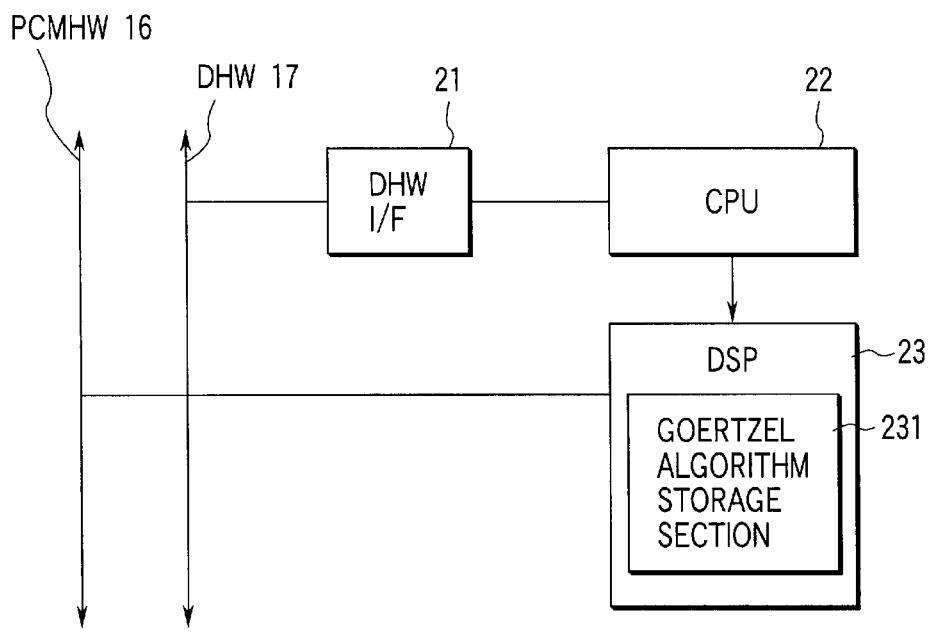
FIG. 3 is a block diagram showing a detailed example of the conventional DTMF signal receiving section shown in FIG. 1, which is implemented using a DSP.
Figure 4:
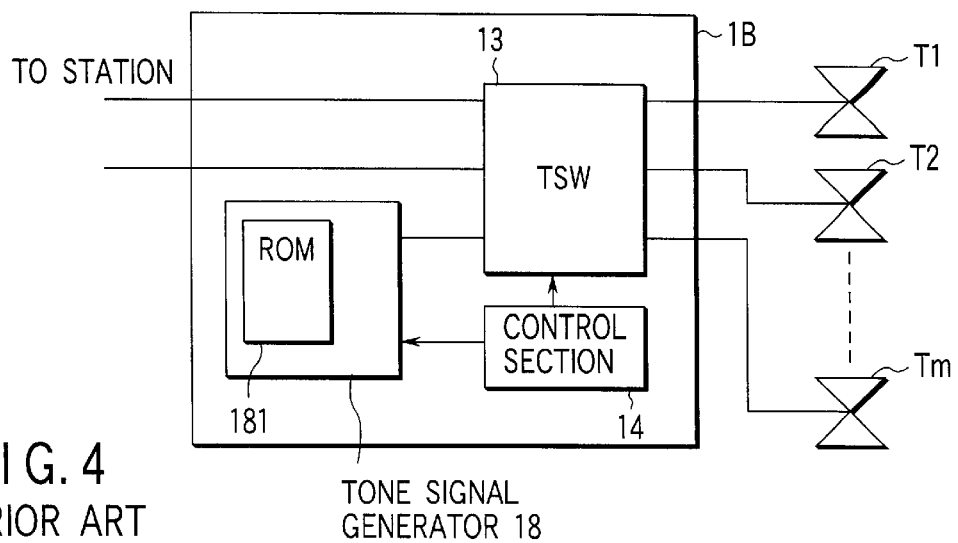
FIG. 4 is a block diagram schematically showing the arrangement of another conventional key telephone system.
Figure 5:
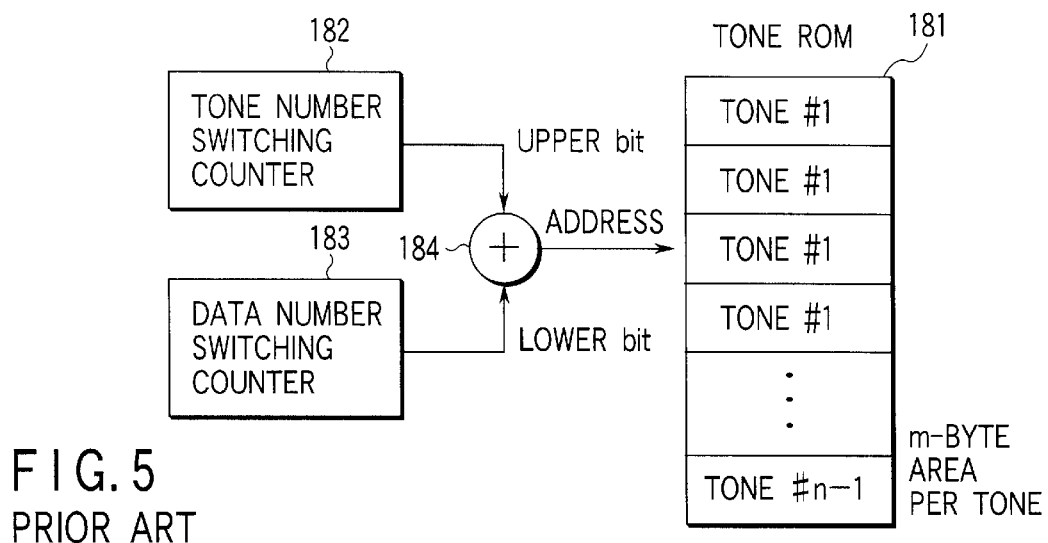
FIG. 5 is a block diagram schematically showing a tone signal generator shown in FIG. 4.

The tone signal transmitting apparatus according to the second embodiment is applied to the main apparatus of a key telephone system, as shown in FIG. 27. The same reference numerals as in FIG. 4 denote the same parts in FIG. 27, and a detailed description thereof will be omitted.

In a main apparatus 1C, the control section 14 is connected to the tone signal transmitting apparatus 300 and time switch section (TSW) 13. Data for each tone and data representing the compression scheme are written in the tone signal transmitting apparatus 300 by the control section 14, and speech communication control is executed for the time switch section 13.

In this key telephone system, at the time of activation, the control section 14 writes pieces of frequency information, amplitude information, rectangular processing information, addition/alternating information, and μ rule/A rule compression information corresponding to necessary tones in the respective storage sections in the tone signal transmitting apparatus 300 and supplies a reset signal. Thus the tone signal transmitting apparatus 300 starts time-divisionally generating a necessary tone signal.

A case wherein a tone signal is to be output to an extension terminal T1 will be described next. The time switch section 13 can process a tone signal output from the tone signal transmitting apparatus 300 in the same way as that for a voice signal sent from the extension terminal T1 because these signals has the same format. Hence, the time switch section 13 switches the line such that the tone signal generated by the tone signal transmitting apparatus 300 is directly sent to the extension terminal T1 In addition, the tone signal can be changed by rewriting data in the tone signal transmitting apparatus 300 by the control section 14.

As described above, according to the second embodiment, instead of having a memory storing waveform information, the storage sections 310 which store frequency information and the storage section 320 which store amplitude information are used, and a sine wave signal to be sent as a tone signal is generated by the sine wave generation section 330 using a plurality of types of frequency information and amplitude information sequentially generated from the storage sections 310 and 320. For this reason, the memory used in the entire apparatus can be made small. In addition, the waveform to be generated can easily be changed by rewriting the frequency information in the storage sections 310 and amplitude information in the storage sections 320 on the basis of an external control signal. In generating a waveform, the waveform changes due to a calculation error. However, the sine wave output can be stabilized by resetting the sine wave generation section 330 at a predetermined interval by the reset generation section 340.

The reset generation section 340 generates the reset signal when the waveform sign monitor circuit 342 detects that the waveform generated by the sine wave generation section 330 changes from + to − instead of generating the reset signal immediately after the end of counting by the timer 341. Hence, the sine wave generation section 330 can be smoothly reset without interrupting the output waveform.

The rectangular processing section 350 has the storage section 354 and register 355 whose information can be rewritten by external control, and the selector 356 capable of selectively deriving the amplitude value of the sine wave signal or the fixed value stored in the latch 353 in accordance with the output from the register 355. This enables control to determine whether the sine wave signal is to be converted into a rectangular wave signal in accordance with an instruction from the control section 14. A sine wave can be generated using an amplitude value after rectangular processing by selectively replacing the amplitude value of the sine wave signal output from the latch 351 and the fixed value output from the latch 353 by the selector 356. For this reason, the amplitude value information storage device for rectangular processing can be omitted.

The addition/alternating processing section 360 has the storage section 364 and register 365 whose information can be rewritten on the basis of a control signal from the control section 14, and the selector 366 for selectively deriving the output from the adder 361 or the output from the selector 363 in accordance with the output from the register 365. Hence, addition processing and alternating processing can easily be switched in accordance with a tone signal to be generated.

The compression section 370 can switch between the A rule and the μ rule for different compression schemes on the basis of a control signal from the control section 14 and selectively compresses the output from the addition/alternating processing section 360 on the basis of the A rule or μ rule. Hence, the compression scheme for a tone signal to be generated can be changed anytime in accordance with an instruction from the control section 14.

In the second embodiment, a tone signal having an arbitrary waveform can easily be generated by rewriting information in at least one of the storage sections 310 and 320, rectangular processing section 350, and addition/alternating processing section 360 by the control section 14.

Third Embodiment

In the third embodiment of the present invention, the tone signal receiving apparatus of the first embodiment shown in FIG. 6 and the tone signal transmitting apparatus of the second embodiment shown in FIG. 20 are integrated into a single tone signal transmitting/receiving apparatus.

FIG. 28 is a block diagram schematically showing the tone signal transmitting/receiving apparatus according to the third embodiment of the present invention. The same reference numerals as in FIG. 6 denote the same parts in FIG. 28, and a detailed description thereof will be omitted.

Referring to FIG. 28, an arithmetic processing section 400 selectively executes tone signal transmission processing or tone signal reception processing on the basis of a parameter generated by a parameter generation section 600.

FIG. 29 is a block diagram schematically showing a detailed circuit example of the arithmetic processing section 400.

Referring to FIG. 29, a product-sum arithmetic circuit 410 in the arithmetic processing section 400 comprises an adder 411, delay element (FF0) 412, delay element (FF1) 413, multiplier 414, and subtractor 415.

The adder 411 adds a predetermined first reference value for each of a plurality of reference frequencies (e.g., 697 Hz, 770 Hz, 852 Hz, 941 Hz, 1209 Hz, 1336 Hz, 1477 Hz, and 1633 Hz) and a predetermined second reference value for each of the plurality of reference frequencies to calculate a product-sum arithmetic value at the current time for each of the reference frequencies. The product-sum arithmetic value is supplied to a selector 420 and also held by the delay element 412 for an arbitrarily settable sampling period and output. The output from the delay element 412 is held by the delay element 413 for an arbitrarily settable sampling period and output.

The multiplier 414 multiples the output value for the delay element 412 by a coefficient determined in accordance with each reference frequency to calculate the first reference value for each reference frequency and outputs it to the adder 411. The subtractor 415 calculates the second reference value from the output value of the delay element 413 and outputs it to the adder 411.

The product-sum arithmetic circuit 410 also has selectors 421, 422, and 423. The selector 421 switches between execution and stop of processing of setting the output value from the delay element 413 to an initial amplitude value determined using the frequency of a tone signal to be generated in accordance with the tone signal transmission processing mode or tone signal reception processing mode. The selector 422 switches the coefficient to be given to the multiplier 414 in accordance with the tone signal transmission processing mode or tone signal reception processing mode. The selector 423 switches between execution and stop of processing of giving an input signal to the subtractor 415 in accordance with the tone signal transmission processing mode or tone signal reception processing mode.

In the product-sum arithmetic circuit 410, in the tone signal transmission processing mode, the selector 421 sets the output value from the delay element 413 to the initial amplitude value determined in accordance with the frequency of the tone signal to be generated, the selector 422 gives to the multiplier 414 the coefficient determined in accordance with the frequency of the tone signal to be generated, i.e., the oscillation frequency value, and the selector 423 derives the input value [0] to the subtractor 415, so the subtractor 415 generates the second reference value as the inverted value of the output value from the delay element 413.

In the product-sum arithmetic circuit 410, in the tone signal reception processing mode, the selector 423 inputs the output signal from a compression/linear conversion section 120 to the subtractor 415, the subtractor 415 subtracts the output value of the delay element 413 from the input signal to calculate the second reference value for each of the reference frequencies, and the selector 422 gives the coefficient determined in accordance with the reference frequency.

The selectors 420 to 423 are switched to tone signal reception processing for three of a plurality of periods obtained by equally dividing one frame period (125 μs) shown in FIG. 30 and switched to tone signal transmission processing for one period obtained by the equal division. One period obtained by the equal division corresponds to the time required for arithmetic processing of the product-sum arithmetic circuit 410.

More specifically, in the arithmetic processing section 400, in the tone signal transmission processing mode, the first reference value obtained by multiplying the output value from the delay element 412 by the coefficient determined in accordance with the frequency of the desired tone signal by the multiplier 414 and the second reference value obtained by inverting the output value from the delay element 413 by the subtractor 415 are added by the adder 411 whereby the tone signal to be transmitted is obtained and selectively derived by the selector 420. This tone signal is output to a PCMHW (not shown) and also supplied to the parameter generation section 600. When the elapse time from the previous reset exceeds a predetermined time, and the polarity of the digital value of the tone signal changes from + to −, the parameter generation section 600 resets the output value from the delay element 412 to [0] and the output value from the delay element 413 to the initial amplitude value determined according to the frequency of the tone signal in accordance with the absolute value of the output digital value.

Additionally, in the arithmetic processing section 400, in the tone signal reception processing mode, the first reference value for each of the reference frequencies is obtained by multiplying the output value from the delay element 412 by the coefficient determined in accordance with the reference frequency by the multiplier 414 and the second reference value for each of the reference frequencies is obtained by subtracting the output value of the delay element 413 from the current input signal by the subtractor 415 and product-sum arithmetic processing of adding by the adder 411 the first reference value for each of the reference frequency and the second reference value for each of the reference is repeatedly executed for the respective reference frequencies. The product-sum arithmetic value calculated for each of the reference frequencies is derived at an absolute value conversion section 140 by the selector 420 and converted into an absolute value by the absolute value conversion section 140, a peak value equal to or larger than a predetermined threshold value is extracted by a comparator 150, and the type of, e.g., a DTMF signal is determined by a matrix section 160 on the basis of at least two extracted peak values.

As described above, in the third embodiment, the product-sum arithmetic circuit 410 which implements the Goertzel algorithm by a digital circuit is shared by tone signal transmission processing and tone signal reception processing. In accordance with the tone signal transmission processing mode or tone signal reception processing mode, an input signal is given to the subtractor 415 in the product-sum arithmetic circuit 410, a coefficient is given to the multiplier 414, and the initial amplitude value is selectively set in the delay element 413.

Hence, the product-sum arithmetic circuit 410 need not be separately prepared for tone signal transmission processing and tone signal reception processing. In addition, in the tone signal transmission processing mode, a tone signal having a desired frequency can be generated only by setting the output value from the delay element 413 in the product-sum arithmetic circuit 410 to the initial amplitude value determined in accordance with the frequency of the tone signal to be generated, giving a coefficient determined in accordance with the frequency of the tone signal to be generated to the multiplier 414, and generating the second reference value by inverting the output value from the delay element 413 by the subtractor 415. Furthermore, in the tone signal reception processing mode, a plurality of frequency spectra including each reference frequency as the center frequency can be detected from an input signal only by giving the input signal to the subtractor 415, subtracting the output value of the delay element 413 from the input signal by the subtractor 415 to calculate the second reference value for each of the reference frequencies, and giving a coefficient determined in accordance with the reference frequency to the multiplier 414. The type of tone signal can be determined on the basis of the detection result.

For this reason, the circuit scale can be reduced in the entire system, and downsizing and reduction of cost and power consumption by integration can easily be realized. In addition, it is convenient because the tone signal receiving apparatus or tone signal transmitting apparatus can be selectively used in a single apparatus, as needed.

In the third embodiment, since the selectors 420 to 423 are set to alternately switch between the tone signal transmission processing mode and the tone signal reception processing mode at a predetermined period, switching control can be automatically executed without manual operation.

In the third embodiment, in the tone signal reception processing mode, the type of tone signal received can be determined by the comparator 150 and matrix section 160 from the product-sum arithmetic value obtained by the product-sum arithmetic circuit 410.

In the third embodiment, the product-sum arithmetic processing for each of the plurality of reference frequencies may be time-divisionally executed. In this case, each delay element only need have a multi-stage structure corresponding to the number of reference frequencies, and the adder 411, multiplier 414, and subtractor 415 can be shared by the respective reference frequencies. Hence, the circuit scale can be further reduced as compared to a case wherein the components are individually prepared.

In the third embodiment, only a tone signal having one frequency is generated. However, a tone signal having a plurality of frequencies may be time-divisionally generated. More specifically, the delay elements 412 and 413 are designed to have a multi-stage structure, coefficients to be multiplied by the multiplier 414 are time-divisionally given, and different initial amplitude values are set for the respective delay elements in accordance with the frequency.

In the third embodiment, only tone signal reception for one channel is performed. However, tone signal reception for a plurality of channels may be time-divisionally performed. In this case, the product of the number of reference frequencies and the number of channels to be time-divisionally processed is used as a variable. Additionally, in this case, the arithmetic processing section 400, absolute value conversion section 140, comparator 150, and matrix section 160 also execute time-divisional processing. If 100 lines are accommodated, and tone signal transmitting/ receiving apparatuses for eight channels are required, a single tone signal transmitting/receiving apparatus suffices to time-divisionally process the eight channels. This greatly contributes to a decrease in circuit scale, and accordingly, cost reduction and downsizing, and reduction of power consumption.

Other Embodiments

The present invention is not limited to the above embodiments. In the above embodiments, a key telephone system has been described. However, the present invention can also be applied to a digital private branch exchange system.

In the first and third embodiments, an example in which a DTMF signal is processed has been described. In addition to the DTMF signal, a tone signal formed by arbitrarily combining q (q is an integer $\geq 2$) predetermined reference frequencies may be processed.

The arrangement of the arithmetic processing section, the arrangement of the comparator, the arrangement of the matrix section, and the arrangements of the respective sections in the tone signal transmitting apparatus can also be modified without departing from the spirit and scope of the present invention.

As has been described above, according to the present invention, a product-sum arithmetic circuit which implements the Goertzel algorithm by a digital circuit is used to discriminate a tone signal, and an appropriate number of samples and coefficient corresponding to each of all frequencies possibly contained in the tone signal are sequentially given to the product-sum arithmetic circuit. Thus the apparatus can cope with an arbitrary frequency contained in an actual tone signal. When an output value equal to or larger than a predetermined threshold value is extracted from the arithmetic result obtained by the product-sum arithmetic circuit, two or more frequencies contained in the tone signal can be detected, and the type of tone signal can be determined on the basis of the detection result.

According to the present invention, the device for discriminating a tone signal can be constructed by a digital circuit. Thus, a tone signal receiving apparatus capable of suppressing an increase in circuit scale, reducing the cost, forming a one-chip structure, and also reducing the power consumption can be provided. In addition, a tone signal receiving apparatus which has a small chip area by circuit scale reduction and is advantageous in constructing an on-chip system for integrating other circuits can be provided.

According to another invention, instead of preparing a memory storing waveform information, memories which store amplitude information and frequency information, respectively, are used, a plurality of types of amplitude information and frequency information stored in these memories are sequentially read out to generate a sine wave signal to be sent as a tone signal. In addition, the apparatus is constructed by a selector for selectively replacing the amplitude value of a sine wave signal with a fixed value under external control, an output selector for selectively deriving an addition output or an alternating output, and a selector for switching between the first compression rule and the second compression rule for different compression schemes.

Hence, according to another invention, a tone signal transmitting apparatus capable of reducing the memory capacity and also flexibly coping with a change in frequency and amplitude value of a waveform, a change in data compression scheme, and switching between 2-frequency addition and 2-frequency alternating in an output waveform can be provided.

According to still another invention, a product-sum arithmetic device which constitutes the Goertzel algorithm by a digital circuit is shared by tone signal transmission processing and tone signal reception processing, and the coefficient and parameter are selectively given to the subtractor, multiplier, and the second delay element in the product-sum arithmetic device.

Hence, according to still another invention, since the product-sum arithmetic device need not be separately prepared for tone signal transmission processing and tone signal reception processing, an increase in circuit scale can be suppressed in the entire system, and downsizing and reduction of cost and power consumption by integration can easily be realized. In addition, it is convenient because the tone signal receiving apparatus or tone signal transmitting apparatus can be selectively used in a single apparatus, as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for receiving and processing a tone signal generated by arbitrarily combining a plurality of reference frequencies, comprising:

processing means for processing the reference frequencies so as to and a first reference value for each of the reference frequencies and a second reference value for each of the plurality of reference frequencies and calculate an arithmetic value at current time for each of the reference frequencies, the first reference value being calculated by multiplying the arithmetic value for each of the reference frequencies by a coefficient, which is held in said processing means, before a predetermined period which is n times of sampling periods, wherein n is an arbitrary natural number, the coefficient being determined in accordance with each of the reference frequencies, the second reference value being calculated by subtracting the arithmetic value for each of the reference frequencies from a current tone signal, which is held in said processing means, before 2 times of the predetermined periods, the arithmetic value being obtained by repeating processing of adding the first reference value and the second reference value a number of times equal to a number of samples corresponding to each of the plurality of reference frequencies;

output value extraction means for extracting an output value equal to or larger than a predetermined threshold value from the arithmetic values for the respective reference frequencies, which are calculated by said processing means; and signal determination means for determining a type of the tone signal on the basis of at least two output values extracted by said output value extraction means.

2. An apparatus according to claim 1, wherein said processing means comprises subtracting means for subtracting a signal the 2n sampling periods before from the tone signal at the current time, adding means for adding an output from said subtracting means to a signal before the determined period to output the arithmetic value, first delaying means for delaying an output from said adding means by the determined period, second delaying means for delaying an output from said first delaying means by the determined period and outputting the value to said subtracting means, and multiplying means for multiplying the output from said first delay means by the coefficient corresponding to the reference frequency and outputting the value to said adding means.

3. An apparatus according to claim 1 or 2, wherein said arithmetic processing means comprises a memory circuit which stores a number of samples and coefficient corresponding to each of the plurality of reference frequencies, and arithmetic control means for controlling said memory circuit sequentially read out and output each number of samples and coefficient from said memory circuit every time arithmetic operation for one reference frequency is ended, and supply the coefficient to said multiplication means to execute arithmetic processing a number of times equal to the number of samples.

4. An apparatus according to claim 1, wherein said output value extraction means comprises a storing means for storing arithmetic values for all the reference frequencies, which are calculated by said arithmetic processing means, in units of frequencies, and reading means for reading out and outputting an output value equal to or larger than a predetermined threshold value from the product-sum arithmetic values stored in said output holding means.

5. An apparatus according to claim 1, wherein said signal determination means has a discrimination table in which discrimination data of the tone signal corresponding to sets of two out of all the reference frequencies possibly contained in the tone signal are stored, and discrimination data output control means for reading and outputting corresponding discrimination data from the discrimination table on the basis of at least two output values from said output value extraction means.

6. An apparatus according to claim 1, wherein said arithmetic processing means, said output value extraction means, and said signal determination means time-divisionally execute processing for each of the plurality of reference frequencies.

7. A tone signal transmitting apparatus for time-divisionally generating a tone signal having a plurality of types of waveforms, comprising:

first generation means, having a memory whose information contents are rewritable by an external control signal, for sequentially generating a plurality of types of amplitude information written in the memory;

second generation means, having a memory whose information contents are rewritable by an external control signal, for sequentially generating a plurality of types of frequency information written in the memory;

third generation means for generating a sine wave signal, as the tone signal on, the basis of the amplitude information output by said amplitude information generation means and the frequency information output by said frequency information generation means; and resetting means for resetting said sine wave generation means at a predetermined interval to stabilize the sine wave signal output for said sine wave generation means.

8. An apparatus according to claim 7, wherein said reset means comprises counting means for counting an elapse time from reset, detecting means for detecting that a sign of the sine wave signal output from said sine wave generation means changes from positive to negative, and resetting means for resetting said sine wave generation means after a predetermined period in response to the detection signal.

9. An apparatus according to claim 7, wherein said resetting means forcibly resets said sine wave generation means upon receiving an external reset signal.

10. An apparatus according to claim 7, further comprising processing means for selectively deriving the sine wave signal output from said sine wave generation means or the amplitude information output from said amplitude information generation means using an output selector for switching in accordance with an external control signal so as to selectively replace an amplitude value of the sine wave signal output from said sine wave generation means with a fixed value.

11. An apparatus according to claim 7, further comprising processing means which includes:

an adder for adding the sine wave signal output from said sine wave generation means and an output from said processing means, an output processor for selectively outputting a first output from said sine wave generation means and a second output from said processing means at a predetermined period, and an output selector for selectively outputting the first output and the second output on the basis of an external control signal.

12. An apparatus according to claim 7 or 11, further comprising compression means, capable of switching between a first compression rule and a second compression rule for different compression schemes on the basis of an external control signal, for selectively compressing an output from said processing means on the basis of the first compression rule or the second compression rule.

13. An apparatus for receiving and processing a tone signal having arbitrarily combining a plurality of reference frequencies, and generating and transmitting a tone signal having a desired frequency in one of transmission and reception processing modes, comprising:

adding means for adding a predetermined first reference value for each of the plurality of reference frequencies and a predetermined second reference value for each of the plurality of reference frequencies within a band of the tone signal to calculate a arithmetic value at current time for each of the plurality of reference frequencies;

first delaying means for delaying an output value from said adding means by a determined period which is n times of sampling periods, wherein n is an arbitrary natural number;

second delaying means for delaying an output value from said first delay means by the determined period;

multiplying means for multiplying the output from said first delay means by the coefficient determined in accordance with a reference frequency to calculate the first reference value for each of the reference frequencies; and calculating means for calculating the second reference value from an output value from said second delay means, wherein in the transmission processing mode, the output value from said second delaying means is set to an initial amplitude value determined in accordance with a frequency of a tone signal to be generated, a coefficient determined in accordance with the frequency of the tone signal to be generated is given to said multiplying means, and the second reference value is generated by said calculating means by inverting the output value from said second delaying means, and in the reception processing mode, an input signal is input to said calculating means, the output value from said second delaying means is subtracted from the input signal to calculate the second reference value for each of the reference frequencies, and the coefficient determined in accordance with the reference frequency is given to said multiplying means.

14. An apparatus according to claim 13, further comprising a first selector for switching between execution and stop of processing of setting the output value from said second delaying means to the initial amplitude value determined using the frequency of the tone signal to be generated in accordance with the tone signal transmission processing mode, a second selector for switching the coefficient to be given to said multiplying means in accordance with the transmission processing mode or the reception processing mode, and a third selector for switching between execution and stop of processing of giving the input signal to the calculating means in accordance with the transmission processing mode or the tone signal reception processing mode.

15. An apparatus according to claim 14, wherein said first, second, and third selectors alternately switch at a predetermined period.

16. An apparatus according to claim 13, further comprising peak extraction means for, in the reception processing mode, extracting a peak value equal to or larger than a predetermined threshold value from the arithmetic values calculated by said adding means for the respective reference frequencies, and signal determination means for determining a type of the tone signal on the basis of at least two peak values extracted by said peak extraction means.

* * * * *